(12) United States Patent
Bryant, II

(10) Patent No.: US 11,116,305 B2
(45) Date of Patent: Sep. 14, 2021

(54) APPLIANCE BELT CLIP AND HOLSTER SYSTEM

(71) Applicant: Charles E. Bryant, II, Blue Spring, MS (US)

(72) Inventor: Charles E. Bryant, II, Blue Spring, MS (US)

( * ) Notice: Subject to any disclaimer, the term of this patent is extended or adjusted under 35 U.S.C. 154(b) by 0 days.

(21) Appl. No.: 17/123,458

(22) Filed: Dec. 16, 2020

(65) Prior Publication Data

US 2021/0186191 A1    Jun. 24, 2021

Related U.S. Application Data

(60) Provisional application No. 62/950,735, filed on Dec. 19, 2019.

(51) Int. Cl.
*A45F 5/02*         (2006.01)
*A45C 11/00*        (2006.01)
*H04B 1/3888*       (2015.01)

(52) U.S. Cl.
CPC .............. *A45F 5/021* (2013.01); *A45C 11/00* (2013.01); *H04B 1/3888* (2013.01); *A45C 2011/002* (2013.01); *A45F 2200/0516* (2013.01)

(58) Field of Classification Search
CPC .. A45F 5/021; A45F 2200/0516; A45C 11/00; A45C 2011/002; H04B 1/3888
USPC ................................. 224/269, 665, 666, 663
See application file for complete search history.

(56) References Cited

U.S. PATENT DOCUMENTS

2021/0000247 A1*   1/2021   Dellwo ................... A45F 5/021

* cited by examiner

*Primary Examiner* — Corey N Skurdal
(74) *Attorney, Agent, or Firm* — Seed IP Law Group LLP

(57) ABSTRACT

An apparatus having a holster to receive an appliance in slidable engagement, an engagement apparatus to hold the appliance in engagement with the holster, a clip sized and shaped to attach to the article of clothing, and a retainer assembly configured to releasably attach the holster to the clip, the clip having a body with a proximal end, a tongue extending from the proximal end to engage with the article of clothing, and a receiver that receives the projection on the holster, the receiver having a through-opening and structured to position the projection against the tongue as the projection is engaged with the receiver to preload the tongue and apply pressure to the article of clothing in response to positioning the article of clothing between the tongue and the projection and thereby retain the clip in positive engagement with the article of clothing.

15 Claims, 32 Drawing Sheets

APPLIANCE BELT CLIP AND HOLSTER SYSTEM

BACKGROUND

Technical Field

The present disclosure relates to devices for holding objects to a belt and, more particularly, to a belt clip with replaceable holster that provides a reliable engagement design for security and comfort.

Description of the Related Art

Numerous holster designs have been proposed for attaching objects to belts, particularly in the cell phone market. Most designs are unable to accommodate all sizes of phones, are difficult to attach and release from the belt, and tend to dig into the belt, clothing, and body of the individual. When used in environments where the individual is engaged in physical work, such as construction, some designs fail to stay attached to the belt, are easily twisted to the point it is uncomfortable, and they present a risk of having the object fall off the belt or out of the holder.

BRIEF SUMMARY

The present disclosure is directed to an apparatus for mounting an appliance to an article of clothing, such as a belt or waist band, or to a backpack tool belt, and the like.

In accordance with a representative implementation of the present disclosure, an apparatus to mount an appliance to an article of clothing is provided. The apparatus includes a holster sized and shaped to receive the appliance in slidable engagement and to attach to the article of clothing, an engagement apparatus that is sized and shaped to attach to the apparatus and includes a mounting block have a stop block and a resistance block extending from a surface of the mounting block that are sized and shaped to engage the holster and hold the appliance in slidable engagement with the holster, and a protective case that is structured to attach to the appliance, the protective case having a first opening sized and shaped to receive the stop block and a second opening sized and shaped to receive the resistance block so that the stop block and resistance block extend through the protective case and beyond the protective case to engage the holster, the protective case structured to attach to the appliance and hold the mounting block in place between the protective cover and the appliance only by pressure between the protective case and the appliance.

In accordance with another aspect of the present disclosure, the holster has a first opening sized and shaped to receive the resistance block within the opening and retain the protective case and appliance in slidable engagement with the holster, and the holster having a second opening sized and shaped to receive the stop block to stop travel of the protective case and appliance within the holster.

In accordance with yet another aspect of the present disclosure, the resistance block has beveled edges to facilitate movement of the resistance block into and out of the second opening in the holster. In addition, a mounting plug is provided that includes a body and first and second protrusions extending from the body that are sized and shaped to be received in the first and second openings, respectively, in the protective case and to not extend past the protective case, the body structured to be held in place between the protective case and the appliance by pressure only between the protective case and the appliance.

In accordance with another implementation of the present disclosure, the apparatus includes a holster sized and shaped to receive the appliance in slidable engagement; an engagement apparatus to hold the appliance in engagement with the holster; a clip sized and shaped to removably attach to the article of clothing; and a retainer assembly configured to releasably attach the holster to the clip.

In accordance with another aspect of the present disclosure, the holster includes a housing with an outside wall and an inside wall to define an interior sized and shaped to receive the appliance in slidable engagement, and wherein the engagement apparatus includes an opening formed in the outside wall of the housing and a projection attached to the appliance that is sized and shaped to slidably engage with the opening in the housing to retain the appliance in engagement with the housing and to enable the appliance to be manually pulled from the housing with a resistance.

In accordance with another aspect of the present disclosure, the retainer assembly includes a first retainer member associated with the holster, a second retainer member associated with the clip, and a third retainer member configured to engage the first and second retainer members and hold the first and second retainer members in place and thereby releasably attach the holster to the clip.

In accordance with a further aspect of the present disclosure, the holster includes a housing with an outside wall and an inside wall to define an interior sized and shaped to receive the appliance in slidable engagement, and wherein the first retainer member comprises a projection extending from the inside wall of the holster and having a slot formed therein, the second retainer member comprises a receiver on the clip sized and shaped to receive the projection on the housing, the receiver including a slot that is sized, shaped, and positioned on the clip to align with the slot in the projection, and the third retainer member comprises a slider sized and shaped to slide into the slot in the first retainer member and into the slot in the receiver to releasably hold the projection in the receiver and thereby attach the holster to the clip.

In accordance with yet another aspect of the present disclosure, a stop assembly configured to limit travel of the appliance into the housing is provided. Ideally, the outside wall of the housing has a proximal edge, and the stop assembly includes a slot with a recessed edge formed in the proximal edge of the outside wall of the housing, and the stop assembly further includes a stop member attached to the appliance that is sized and shaped to slidably engage the slot and bear against the recessed edge to prevent further travel of the appliance into the holster.

In accordance with still yet a further aspect of the present disclosure, the holster includes an outside wall and an inside wall and a projection extending from the inside wall, and wherein the clip comprises a body that includes a proximal end, a resilient tongue extending from the proximal end to engage with the article of clothing, and a receiver sized and shaped to receive the projection on the holster, the receiver having a through-opening and structured to position the projection against the tongue as the projection is engaged with the receiver to preload the tongue and apply pressure to the article of clothing in response to positioning the article of clothing between the tongue and the projection and thereby retain the clip in positive engagement with the article of clothing.

In accordance with a further aspect of the present disclosure, the body of the clip has an interior side and an exterior side, and the resilient tongue is located on the interior side of the body, the body having a longitudinal axis and the proximal end of the clip is angled away from the longitudinal axis of the body to form an obtuse angle with the interior side of the body of the clip.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
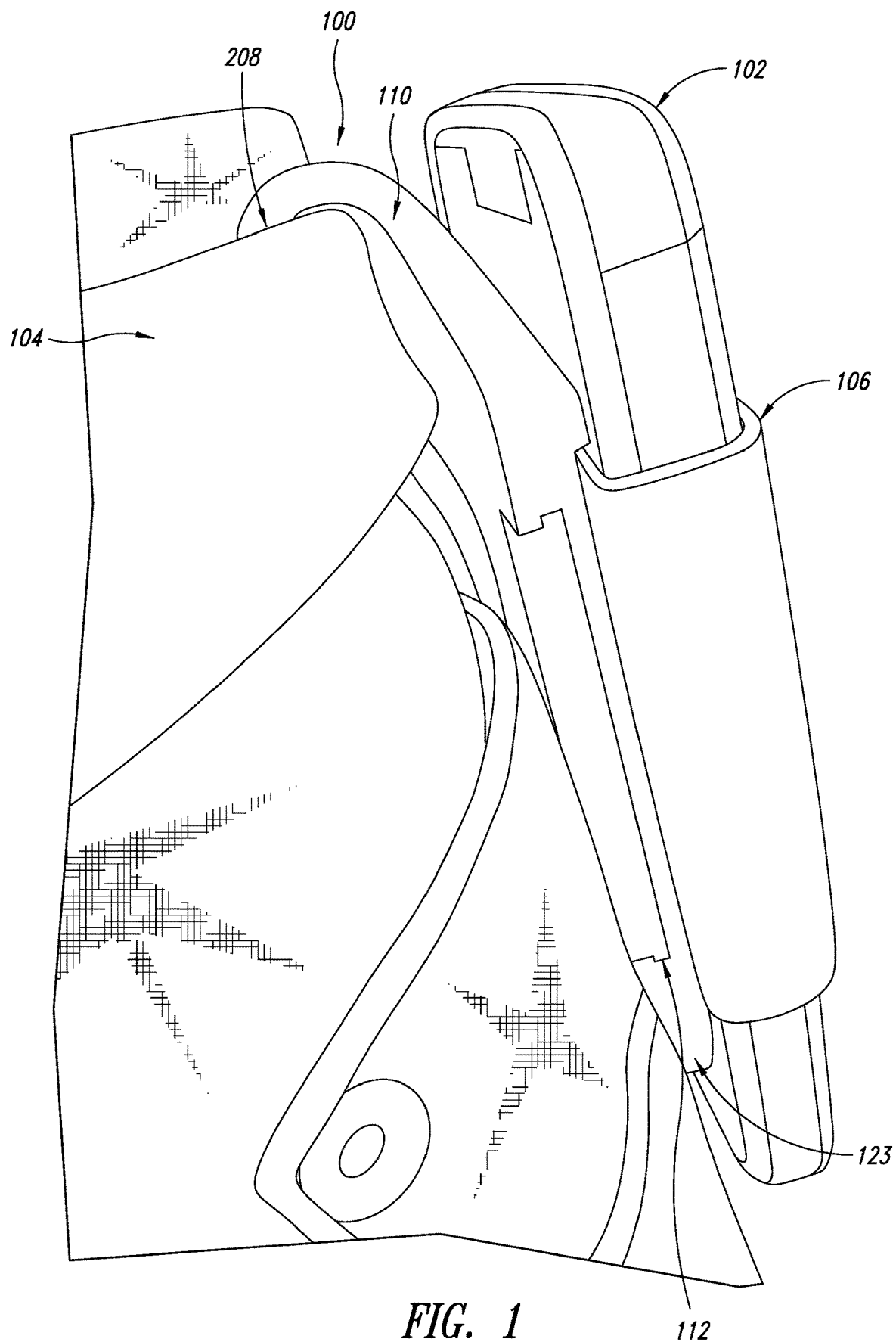
FIG. 1 is an axonometric view of an appliance belt clip and holster apparatus formed in accordance with the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with belts, clips, springs, retaining mechanisms, and the like, and also for cell phones and cell phone cases, as well as anatomical features of the body of humans or animals have not been shown or described in order to avoid unnecessarily obscuring descriptions of the various implementations of the present disclosure.

Unless the context requires otherwise, throughout the specification and claims that follow, the word "comprise" and variations thereof, such as "comprises" and "comprising," are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

The various implementations described above can be combined to provide further embodiments. Aspects of the embodiments can be modified, if necessary to employ concepts of the various patents, applications and publications to provide yet further embodiments.

As shown in the figures, in one implementation of the present disclosure, an apparatus 100 is provided that mounts an object or appliance, in this case a cell phone 102, to an article of clothing, such as a belt 104. The cell phone 102 as shown and described herein includes a case, such as a protective case that is readily commercially available and will not be described in detail herein. The apparatus 100 includes a holster 106 that is sized and shaped to receive the cell phone 102 in slidable engagement in the interior of the holster 106, an engagement apparatus to hold the cell phone 102 in engagement with the holster 106 as described in more detail herein below, a clip 110 sized and shaped to removably attach the apparatus 100 and cell phone 102 to the belt 104, and a retainer assembly configured to releasably attach the holster 106 to the clip 110.

Figure 2:
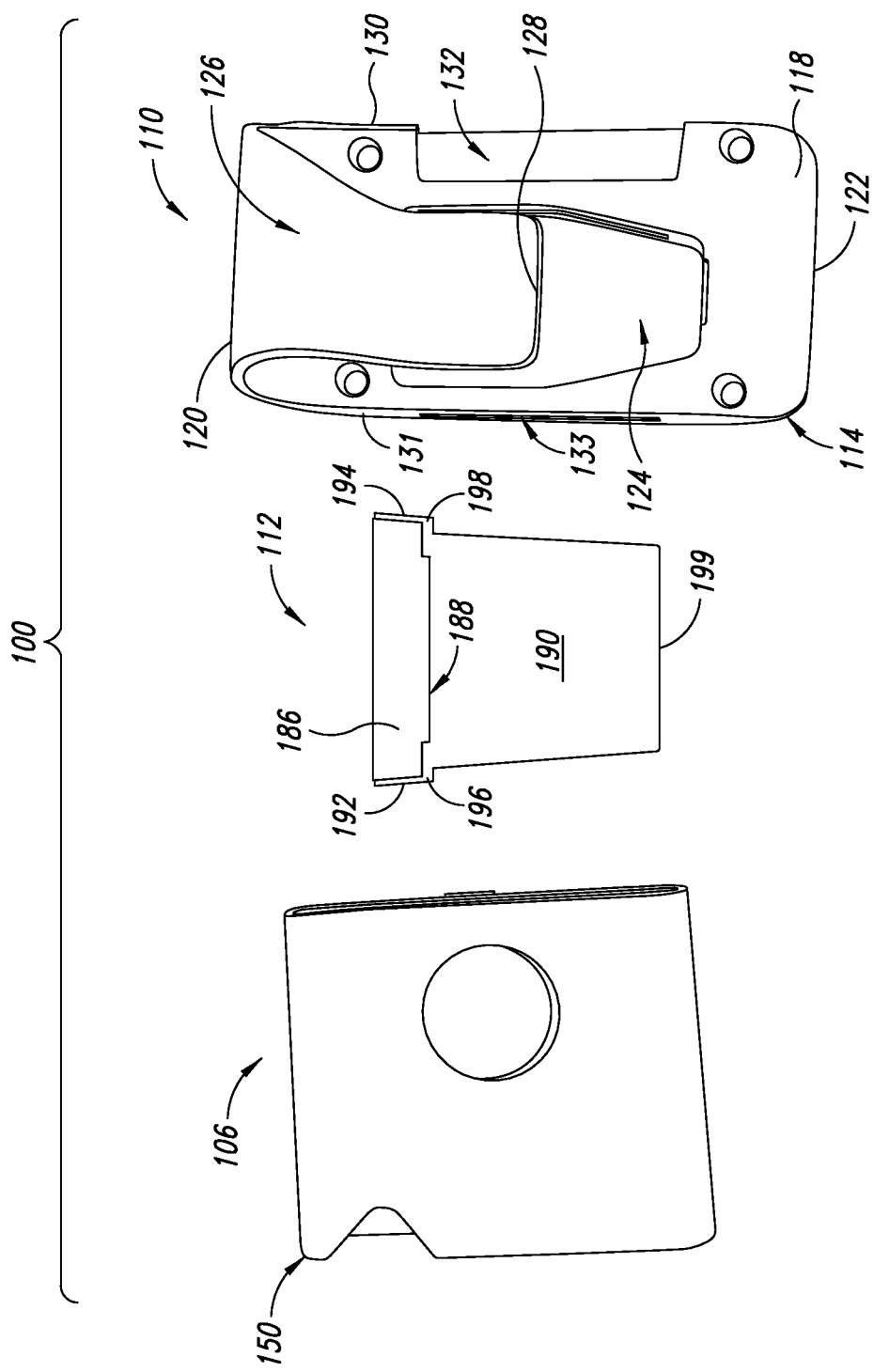
FIG. 2 is an exploded plan view of the appliance belt clip and holster apparatus of FIG. 1.
Figure 3:
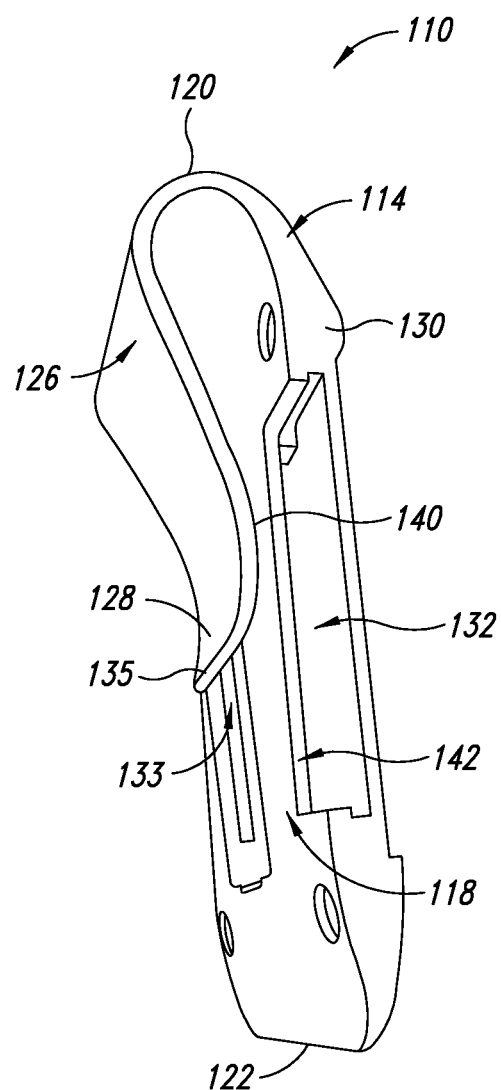
FIG. 3 is an axonometric view of the clip formed in accordance with the present disclosure.
Figure 4:
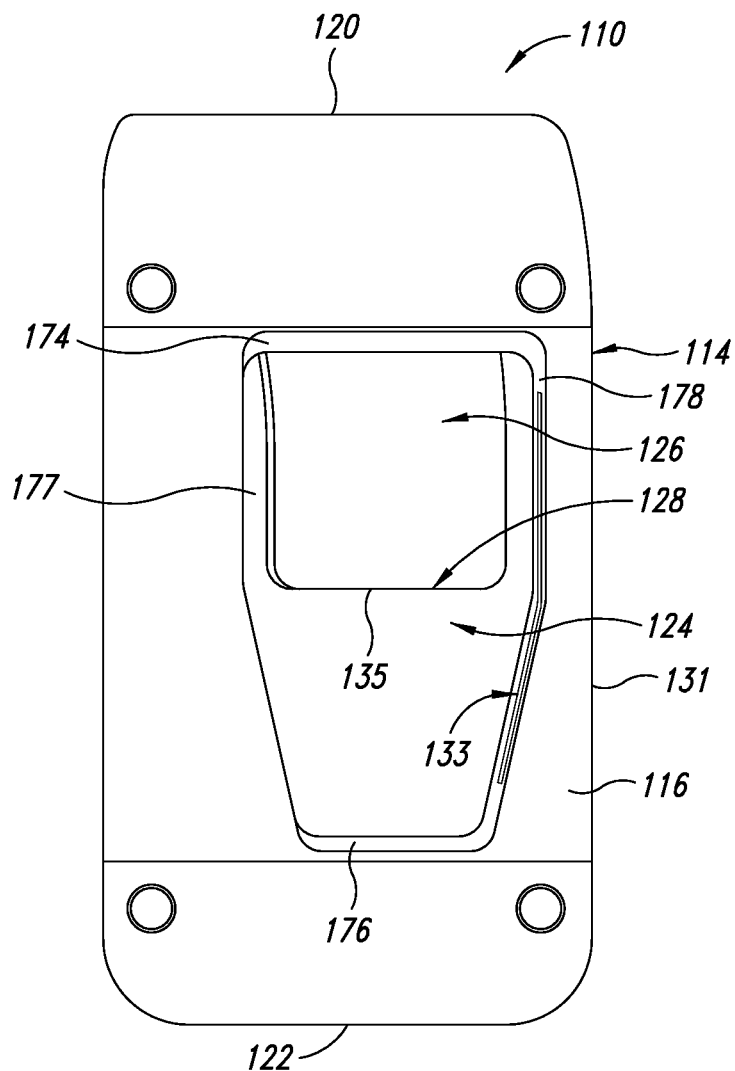
FIG. 4 is a front elevation of the clip of FIG. 3.
Figure 5:
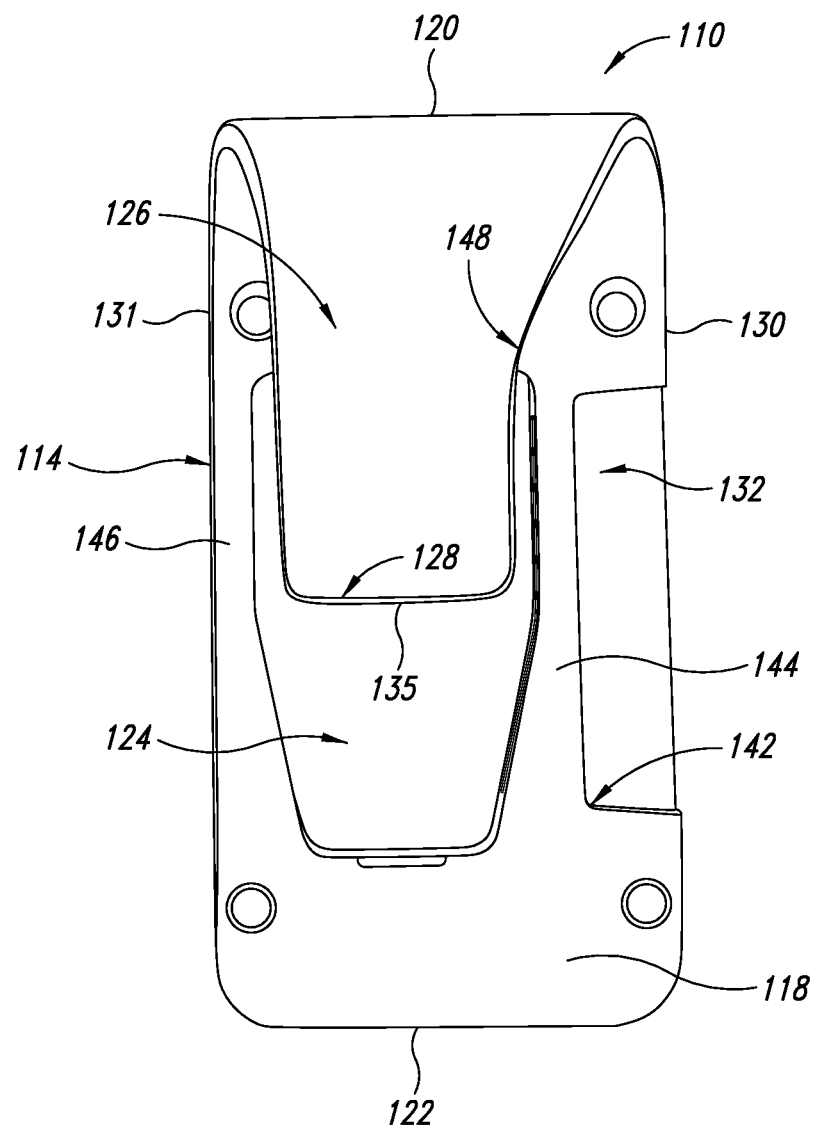
FIG. 5 is a rear elevation of the clip of FIG. 3.
Figure 6:
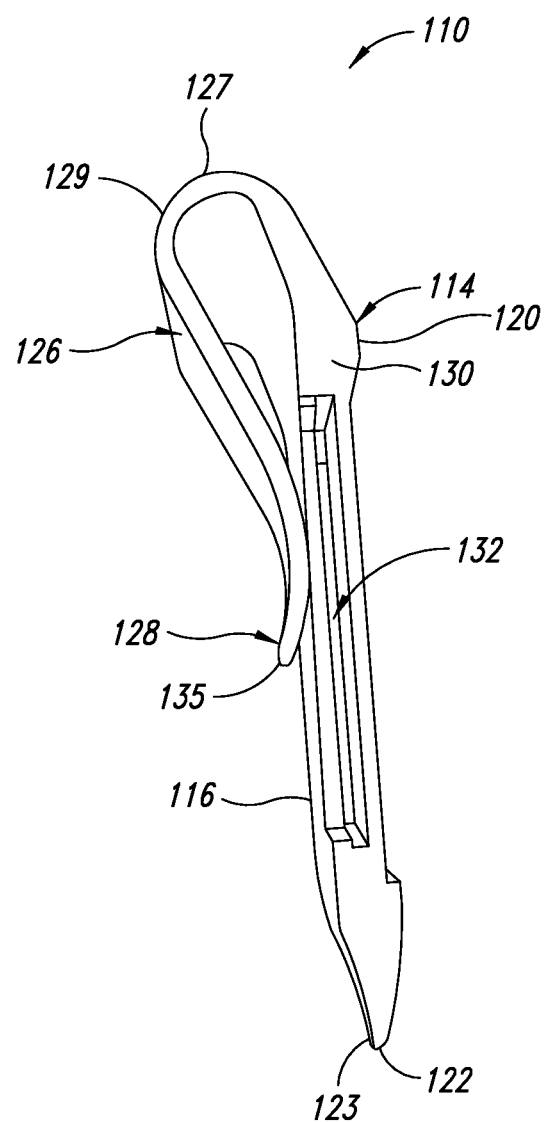
FIG. 6 is a left side elevation of the clip of FIG. 3.
Figure 7:
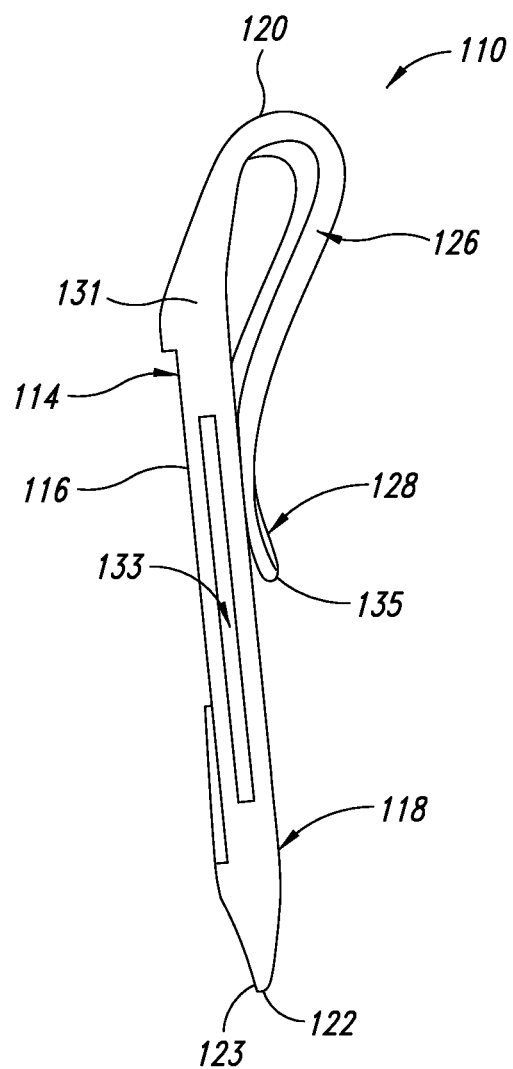
FIG. 7 is a right side elevation of the clip of FIG. 3.
Figure 8:
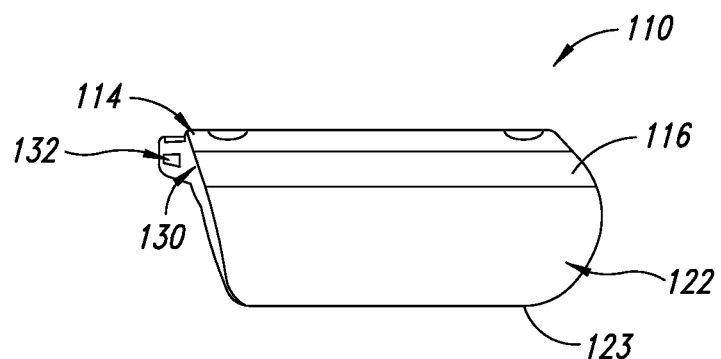
FIG. 8 is a top plan view of the clip of FIG. 3.
Figure 9:
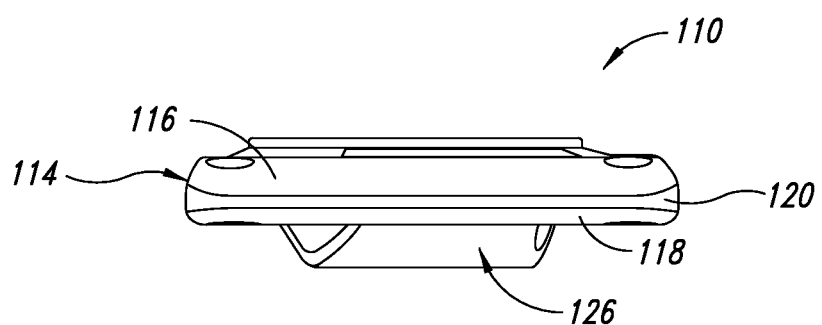
FIG. 9 is a bottom plan view of the clip of FIG. 3
Figure 10:
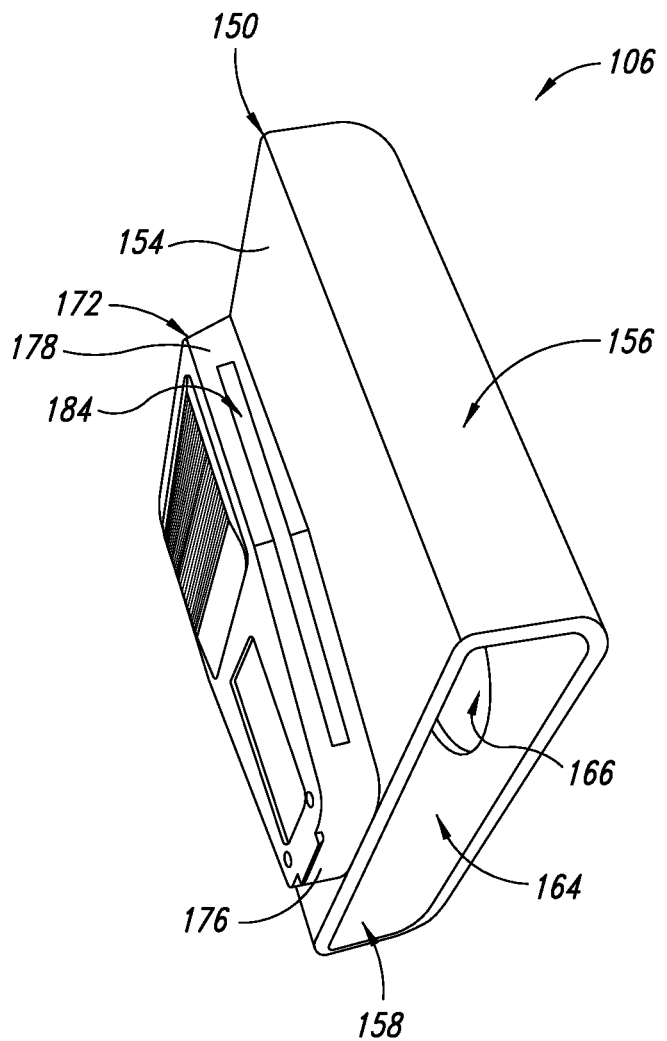
FIG. 10 is an axonometric view of the holster formed in accordance with the present disclosure.
Figure 11:
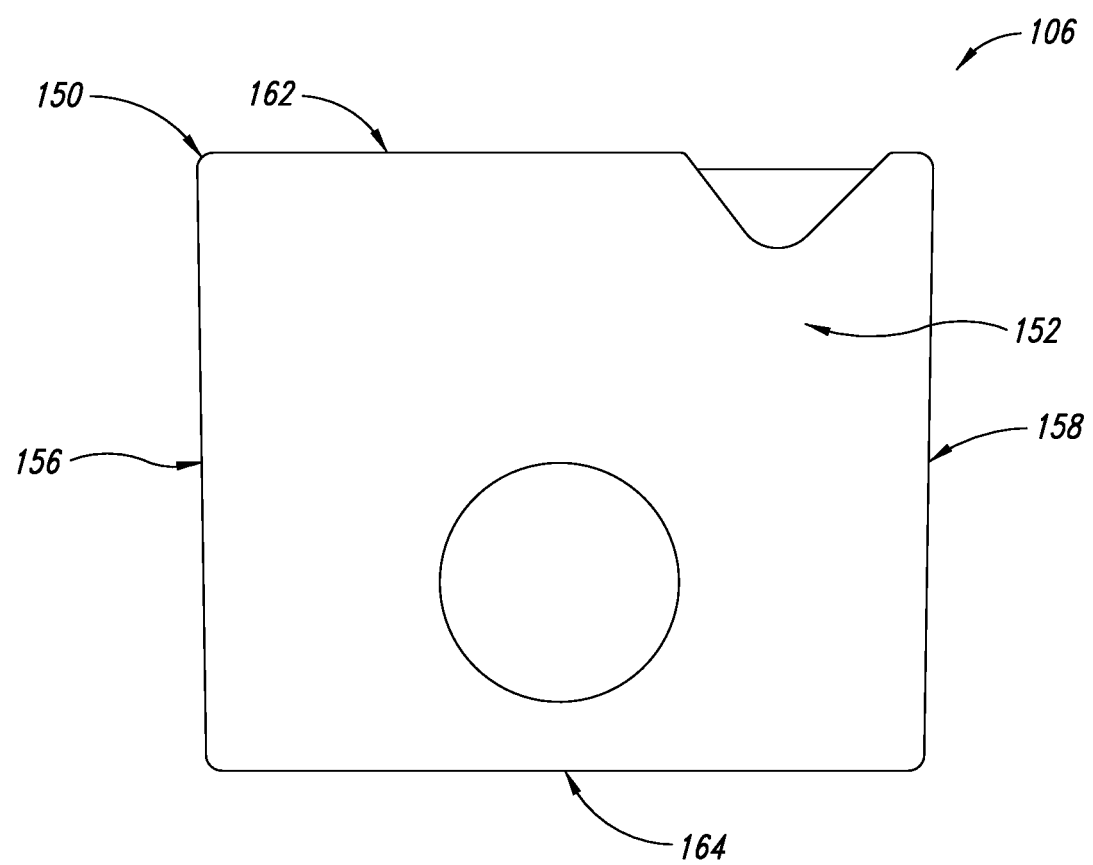
FIG. 11 is a front elevation of the holster of FIG. 10.
Figure 12:
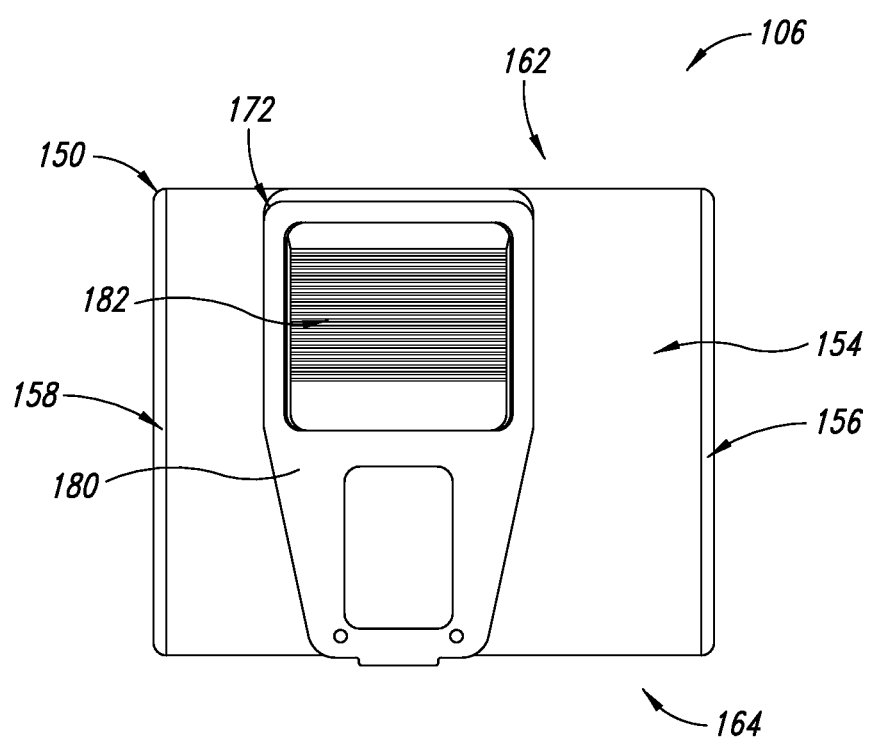
FIG. 12 is a rear elevation of the holster of FIG. 10.
Figure 13:
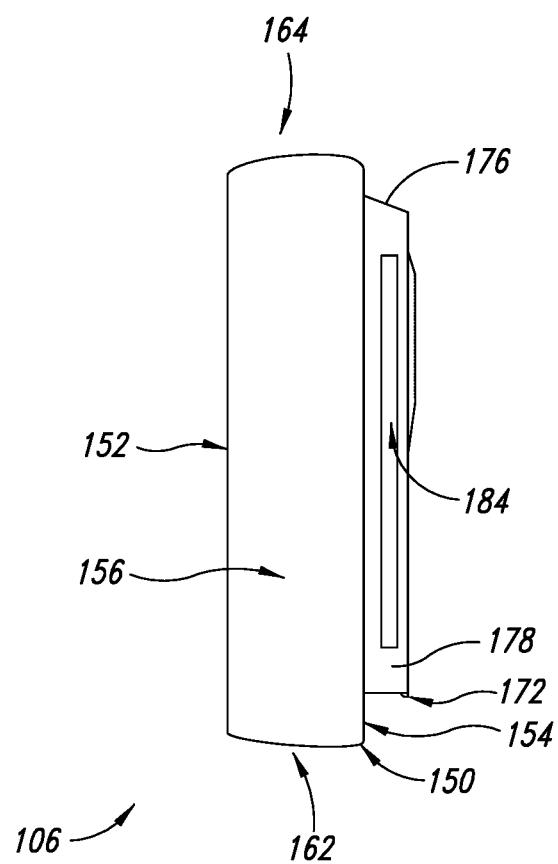
FIG. 13 is a left side elevation of the holster of FIG. 10.
Figure 14:
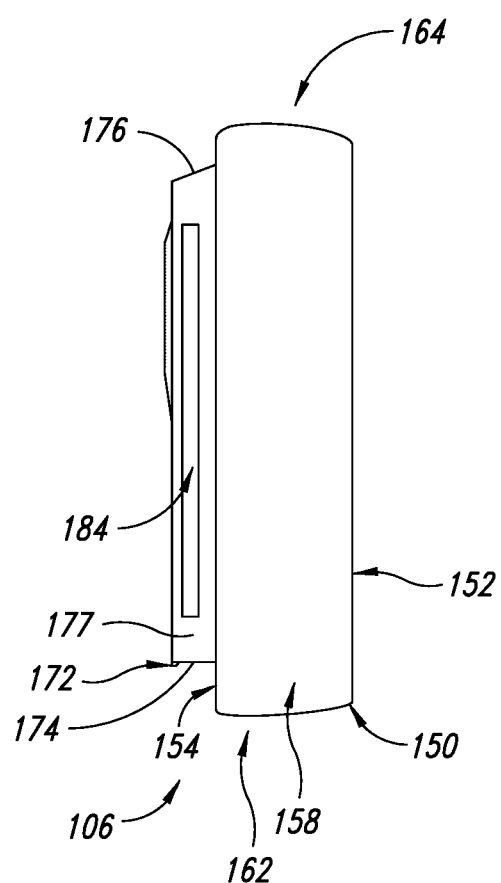
FIG. 14 is a right side elevation of the holster of FIG. 10.
Figure 15:
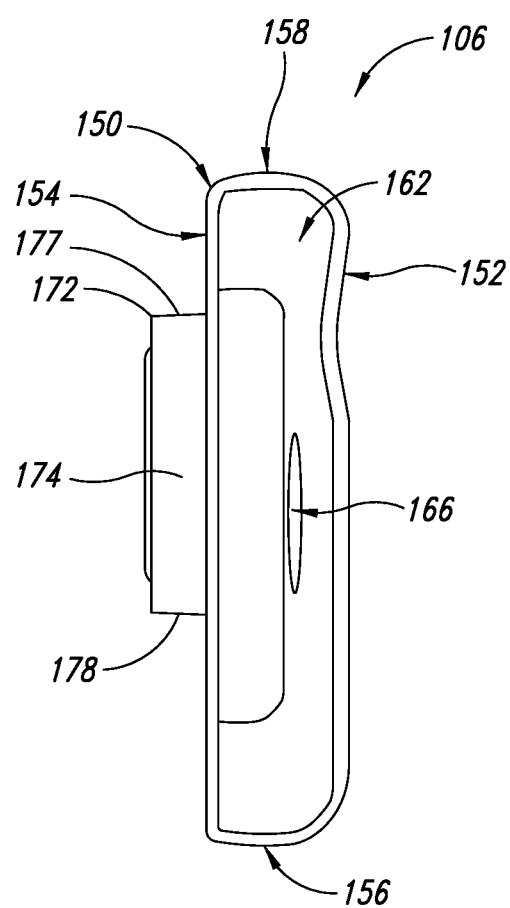
FIG. 15 is a top plan view of the holster of FIG. 10.
Figure 16:
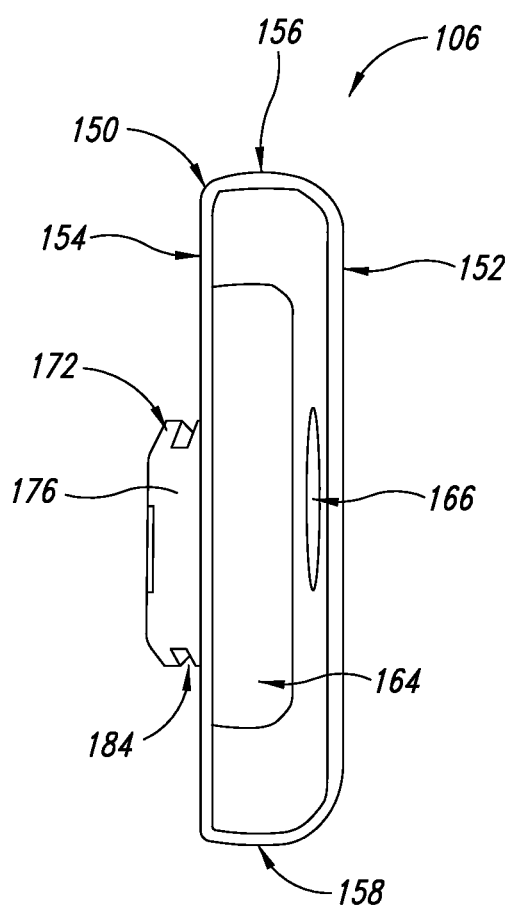
FIG. 16 is a bottom plan view of the holster of FIG. 10.
Figure 17:
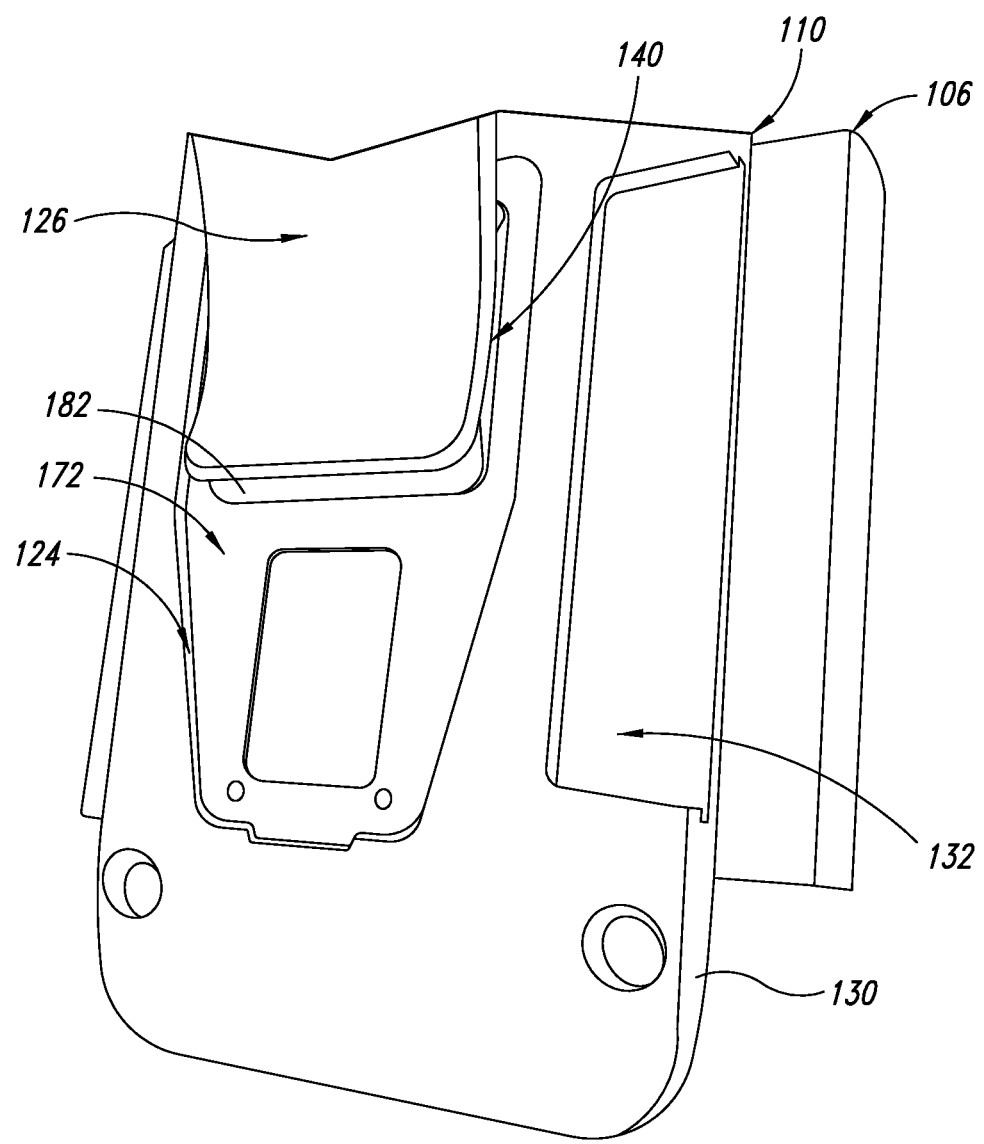
FIG. 17 is a left side rear axonometric view of the partially assembled clip and holster in accordance with the present disclosure.

In FIGS. 1 and 2 the three main components of the assembly or apparatus 100, which are the holster 106, the clip 110, and a slider 112 that cooperates with the clip and the holster 106 to hold the holster 106 in engagement with the clip 110 are described in more detail hereinbelow.

FIGS. 3-9 illustrate the clip 110 from various perspectives in order to show not only the functional features of the clip but also the aesthetics of the ornamental design, including symmetry and lack thereof, balance and lack thereof, curves, and other cosmetic features. The clip 110 includes a main body 114 having a front face 116 and a rear face 118, a top 120, and a bottom 122 that is chamfered to form a third (lower) contact point 123. A first opening 124 extends through the body 114 from the front face 116 through the rear face 118. A resilient arm 126 extends from the top 120 of the body 114, curves outward over the rear face 118, and then curves downward towards the rear face 118, with a distal end 128 terminating over the first opening 124. More particularly, the resilient arm 126 has a proximal end 127 (shown more clearly in FIG. 6) extending from the top at less than a 180 degree angle to form a second (upper) contact point 129, and the distal end 128 is also curved outward from the rear face 118 to form a second contact point 135. The body 114 further includes opposing left and right side walls 130, 131, respectively, with a pair of left and right second openings 132, 133, respectively, formed in each opposing side wall 130, 131 respectively, that are orthogonal to the first opening 124 and intersect the first opening 124.

Ideally the distal end 128 of the resilient arm 126 has a convex outwardly curved surface 140 that extends into the first opening 124 when in a relaxed state. Essentially it breaks a plane of the planar rear face 118 of the clip body 114. This is to provide tension when the apparatus is assembled, as will be explained more fully below.

In accordance with one aspect of the present disclosure, the rear face adjacent the opening 132 in the side wall 130 is formed with a cutout 142 that is slightly less than a longitudinal length of the first opening 124 and extends towards a longitudinal axis of the body 114 to leave an elongate wall 144 that forms one side of the opening 124. An opposing elongate wall 146 forms an opposing side of the opening 124 and is shaped to provide symmetry to the opening 124. As such, the opening 124, when viewed from the rear as in FIG. 5, can be seen to be offset towards the right side 131 of the body 114. Similarly, the resilient arm 126 has a left side 148 that is curved inward so that a width of the distal end 128 does not exceed a width of the opening 124.

In accordance with another aspect of the present disclosure, the opening 124 has a planform shape that is substantially rectilinear near the top 120 of the body and then tapers inward starting at a midpoint of the opening 124 just below the distal end 128 of the resilient arm 126 to be narrower in width. For aesthetics, the narrowest width of the opening 124 can match a narrowest width of the resilient arm at its distal end 128. This is not required for function but does present a more symmetrical relationship between the opening 124 and the arm 126.

Referring next to FIGS. 2 and 10-16, shown therein in greater detail is the holster 106 that includes a housing 150 with a front wall 152 and an opposing rear wall 154 that are held in spaced parallel relationship by first and second side walls 156, 158 to define an interior with an open top and bottom 162, 164, respectively, that is sized and shaped to receive the appliance, in this representative implementation a cell phone 102, in slidable engagement.

Figure 22:
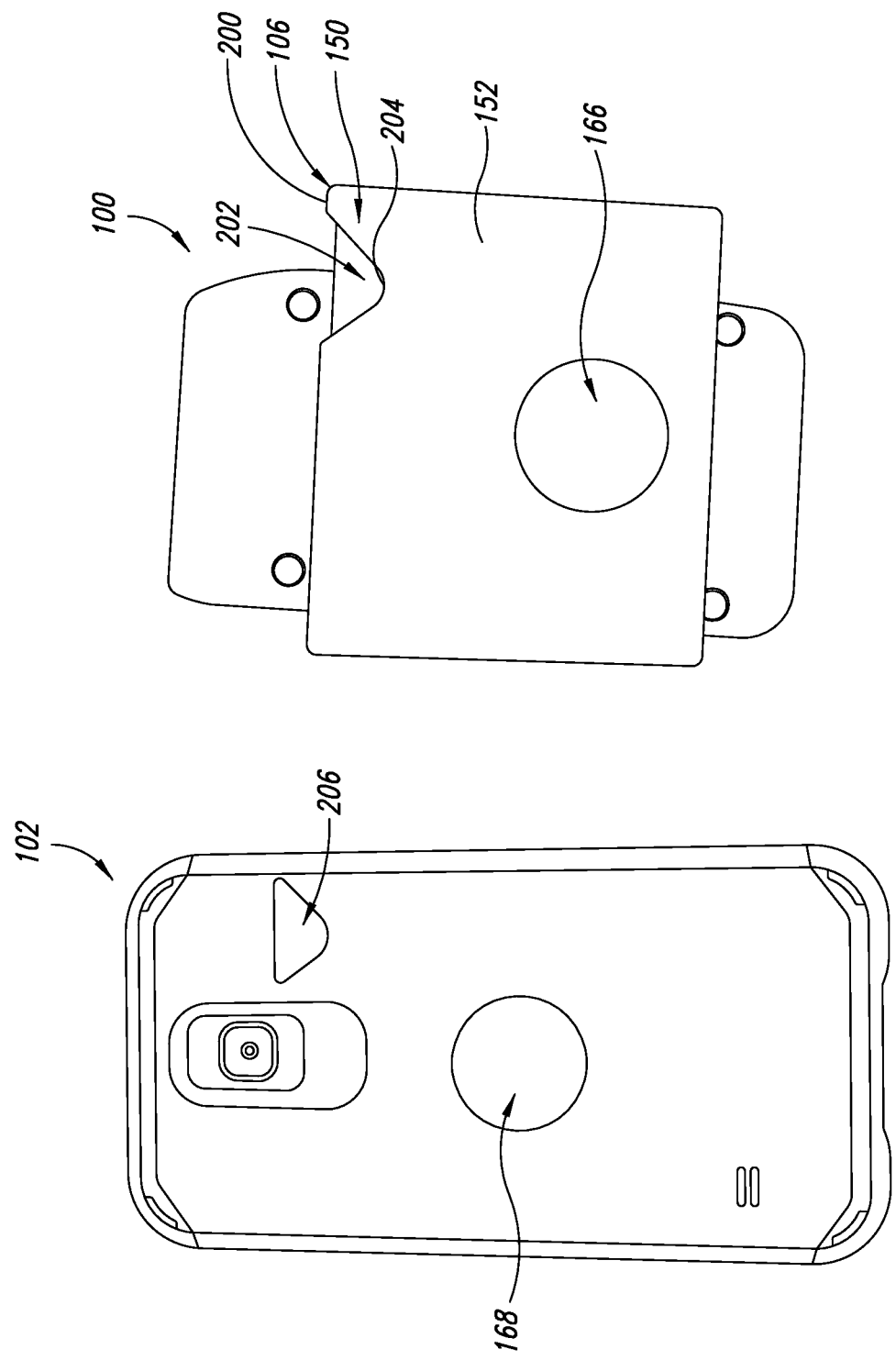
FIG. 22 is a front elevation exploded view of the assembled apparatus of FIG. 18 and a cell phone.
Figure 23:
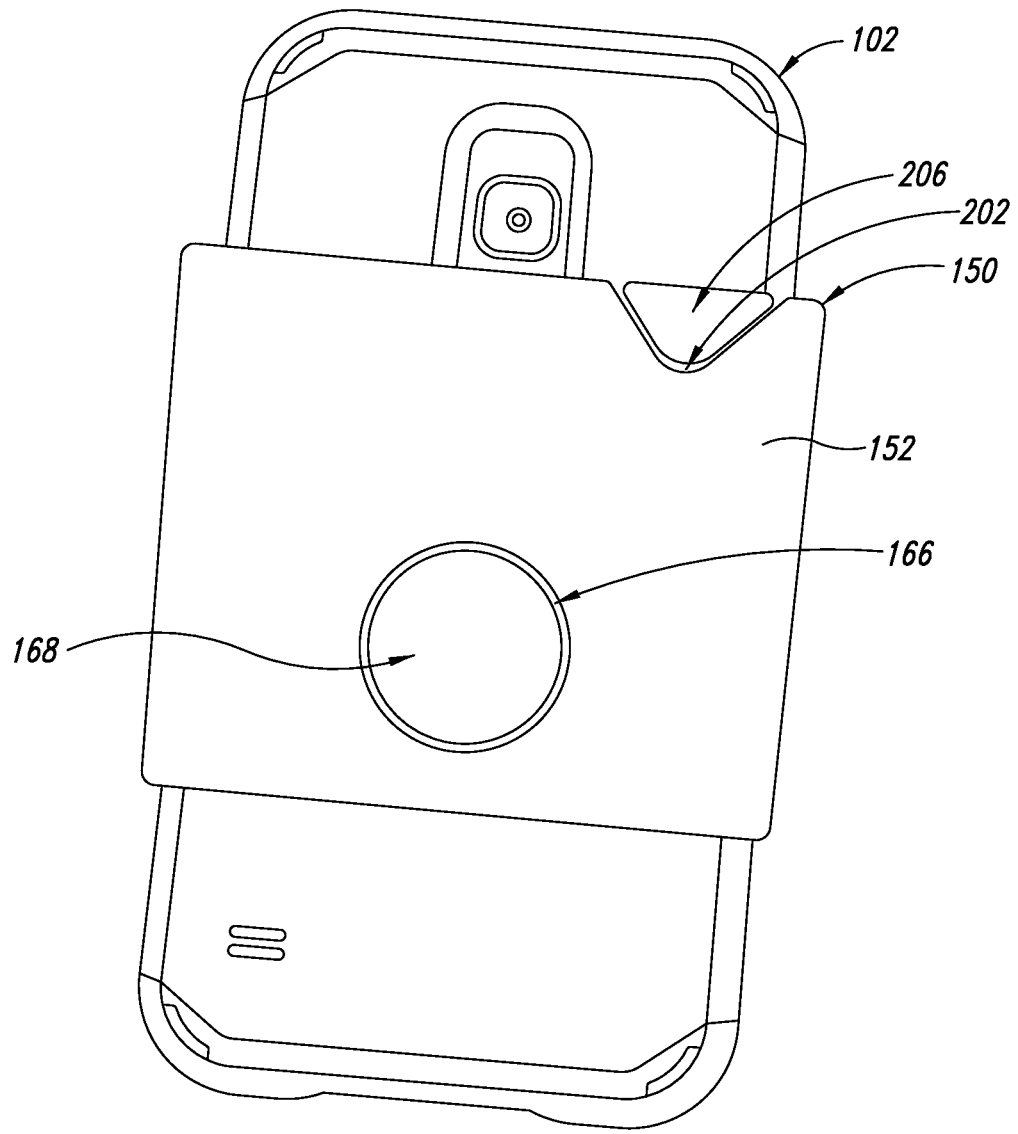
FIG. 23 is a front elevation showing the cell phone in slidable engagement with the holster.
Figure 24:
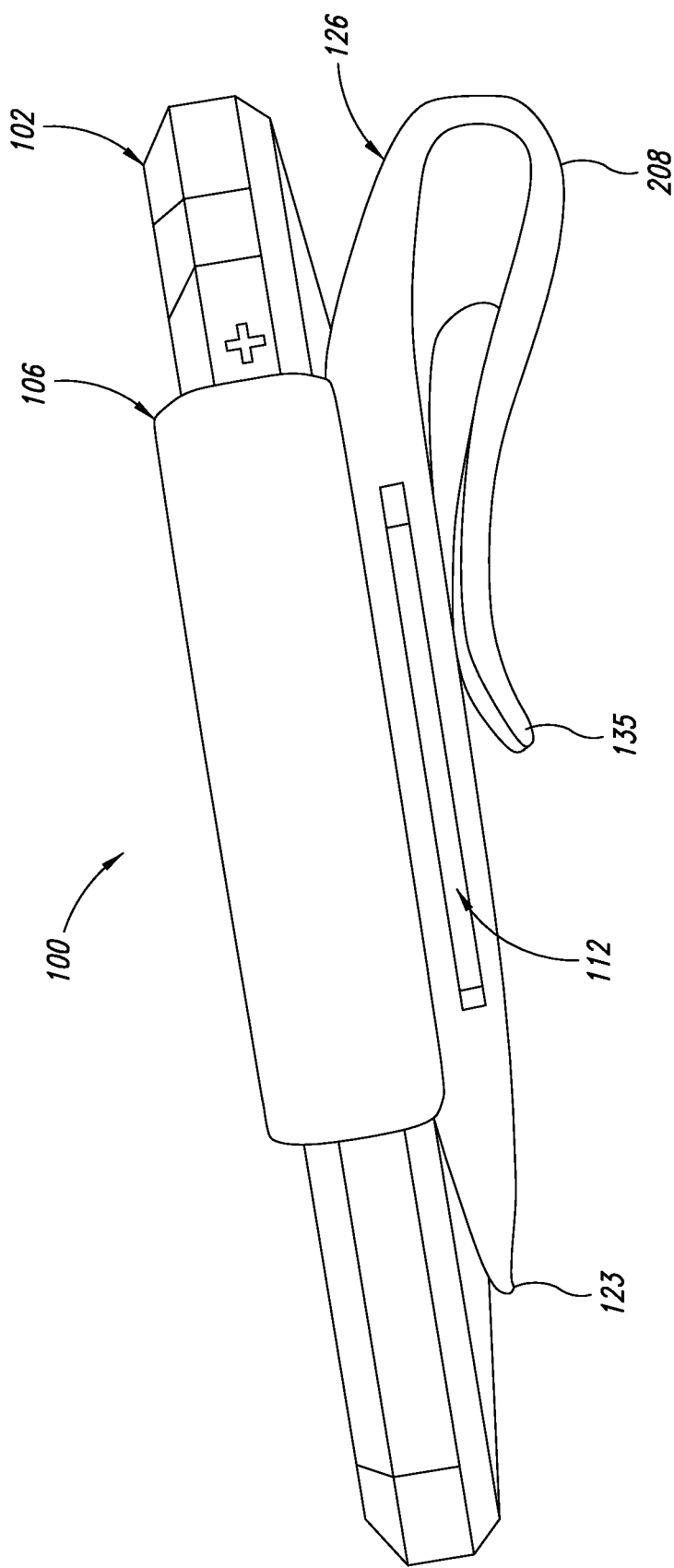
FIG. 24 is a right side elevation showing the cell phone and apparatus of FIG. 23.

An engagement assembly is provided that includes an opening 166 formed in the outside wall or front wall 152 of the housing 150 and a projection 168 attached to the cell phone 102 or more preferably to the protective case of the cell phone 102, as shown in FIGS. 22-23, that is sized and shaped to slidably engage with the opening 166 in the housing 150 to retain the cell phone 102 in engagement with the housing 150 and to enable the cell phone 102 to be manually pulled from the housing 150 with a resistance. In one implementation, the projection 168 on the cell phone 102 can be a piece of material that is adhered to the cell phone 102 with either permanent or non-permanent adhesive. Additionally, the projection 168 could be injection molded with the protective case on the cell phone 102. The size, shape, and placement of the projection 168 and corresponding size, shape, and location of the opening 166 is a matter of design choice for cosmetic appeal.

Also shown in FIGS. 22-23 is an optional stop assembly to aid in stopping the travel of the cell phone 102 into the holster 106. In the representative implementation shown in FIGS. 22-23, the outside wall or front wall 152 of the housing 150 has a proximal edge 200, and the stop assembly includes a slot 202 with a recessed edge 204 formed in the proximal edge 200. The stop assembly further includes a stop member 206 attached to the appliance, in this case the back of the cell phone 102, on the same side as the projection 168. The stop member is sized and shaped to project outward from the cell phone 102 to slidably engage the slot 202 and bear against the recessed edge 204 to prevent further travel of the cell phone 102 into the holster housing 150. As shown in FIGS. 22-23, the slot 202 and the stop member 206 have a nearly identical planform shape, in this case a triangular shape with rounded corners that prevent snagging on cloth. The radius of curvature of the corners of the slot 202 and stop member 206 is a design choice for aesthetics. Other geometric shapes may be used as desired, which is also a matter of ornamentation.

In accordance with one aspect of the present disclosure, both the circular projection 168 and the stop member 206 are located longitudinally along the back of the cell phone 102 by the user when they are attached to determine the depth to which the cell phone 102 is received into the holster 150. Preferably, a strong backing adhesive is used to attach the projections 168 and 206 to the cell phone 102 or the protective case, or the projections 168 and 206 can be integrally formed with the cell phone 102 or protective case.

Figure 18:
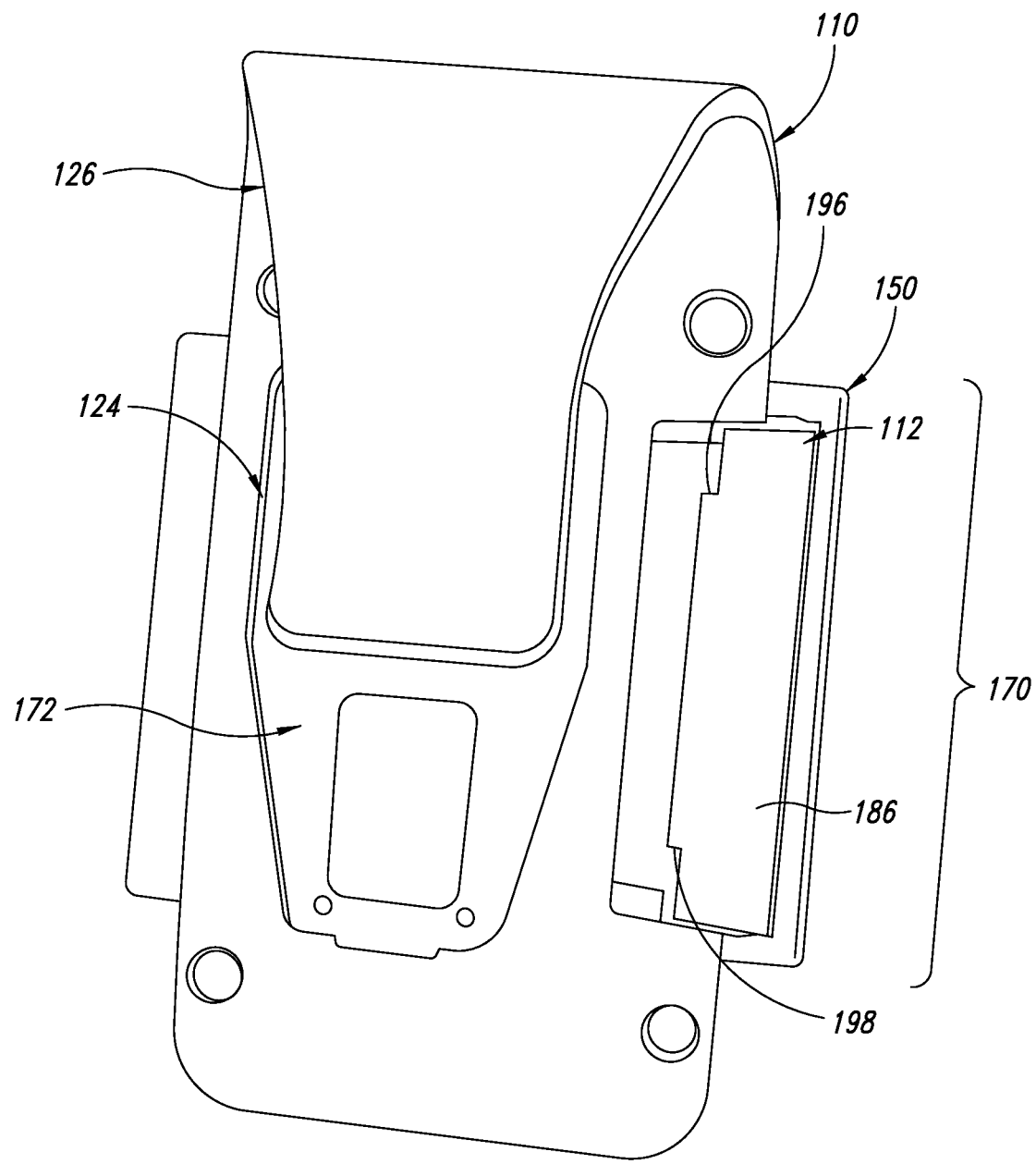
FIG. 18 is a left side top axonometric view of the holster assembled to the clip with the slider partially in position.
Figure 19:
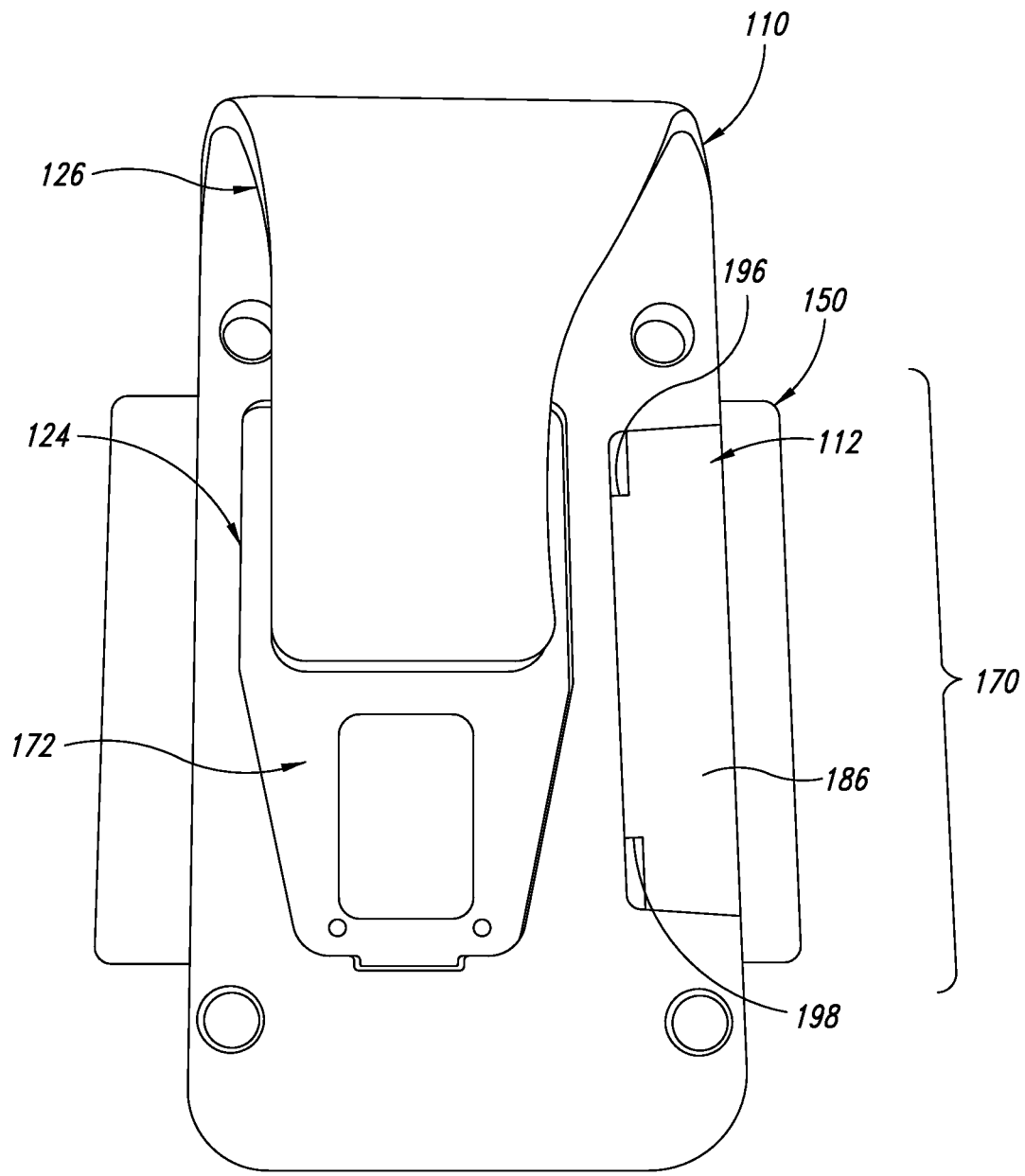
FIG. 19 is a rear elevation of the assembled apparatus of FIG. 18 showing the slider fully in place.
Figures 20, 21:
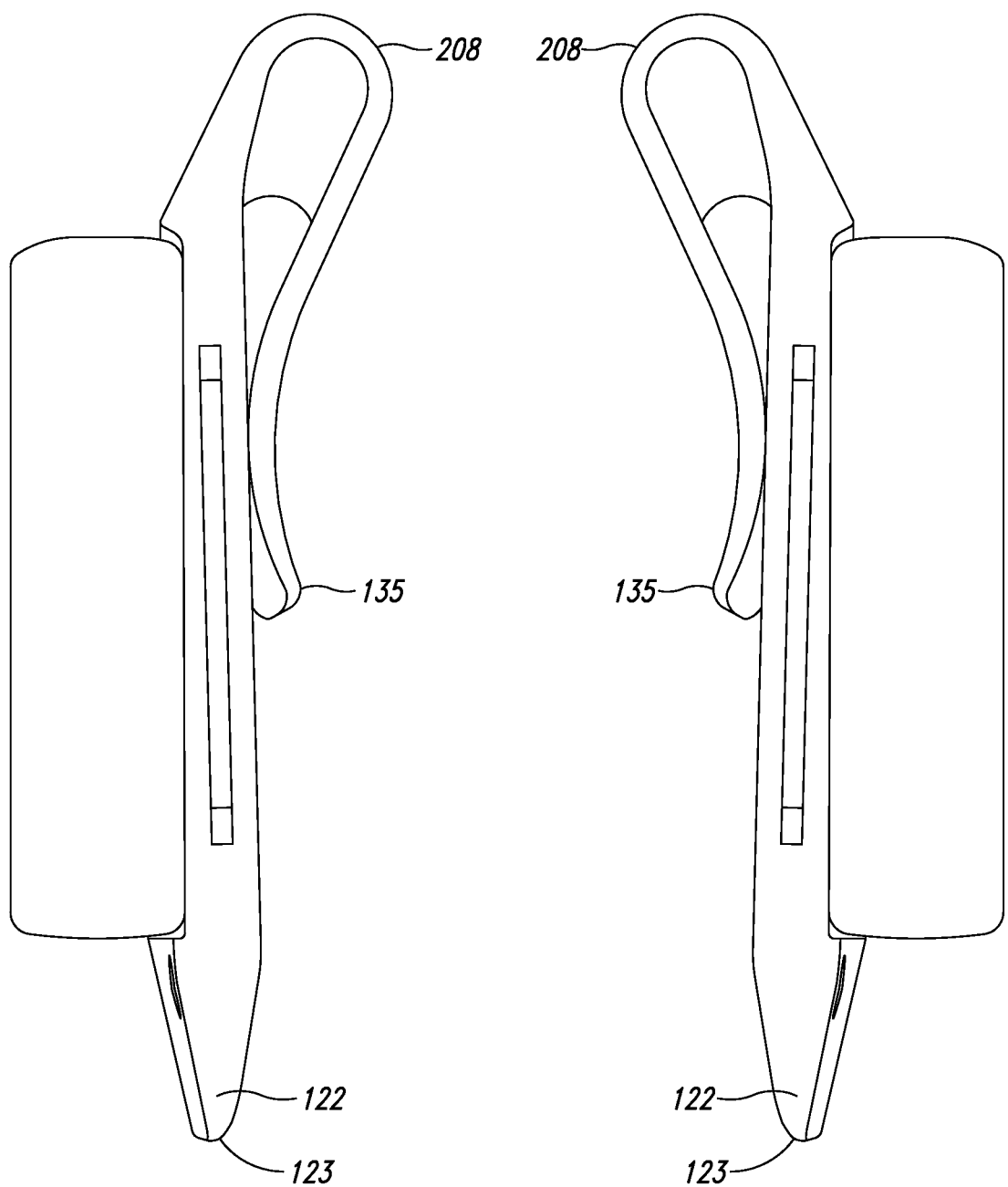
FIG. 20 is a left side elevation of the assembled apparatus of FIG. 18.
FIG. 21 is a right side elevation of the assembled apparatus of FIG. 18.

A retainer assembly 170 is provided, as shown more clearly in FIGS. 18-19, that is configured to releasably attach the holster 106 to the clip 110. In one implementation, the retainer assembly includes a first retainer member or extension 172 associated with the holster, a second retainer member associated with the clip in the form of a receiver that includes the opening 124 in the body 114 and openings 132, 133 in the sides 130, 131, clip body 114, and a third retainer member in the form of the slider 112 configured to engage the openings 132, 133 and the extension 172, as described in more detail below, to releasably attach the holster 106 to the clip 110.

The first retainer member is the extension 172 that is attached to or formed integrally with an exterior of the rear wall 154 of the housing 150. The extension 172 has a top wall 174, bottom wall 176, and first and second side walls 177, 178. As can be seen most clearly in FIG. 12, the extension 172 is sized and shaped to fit within the opening 124 in the body 114 of the clip 110. The extension 172 has a rear face 180 with a pad 182 that preferably is textured or serrated or lined with edges that are configured to grip the belt 104 or other article of clothing when the apparatus 100 is worn. The pad 182 is sized, shaped, and positioned to be located adjacent the outwardly curved surface 140 of the retaining arm 126 when the apparatus 100 is assembled as described below.

The extension 172 has a central opening 184 that extends from the first wall 177 through the second wall 178. The opening 184 is sized and shaped to receive the slider 112. The opening is positioned in the extension 172 to line up with the first and second openings 132, 133 in the body 114 of the clip 110 when the extension 172 is placed all the way into the opening 124 in the clip 110.

The slider 112 is substantially a flat component with a grip 186 formed at one end that consists of a raised section that forms a shoulder 188 with the main body 190. As seen in FIG. 2, the slider 112 has a pair of left and right extensions 192, 194 extending from the body 190. The grip 186 is not as wide as the body 190, thus forming a left and right shoulder 196, 198. The planform shape of the slider 112 is preferably a truncated triangle with the distal end 199 having a shorter width than the width of the body 190 at the left and right extensions 192, 194. This shape facilitates pushing of the slider through the two openings 132, 133 in the clip body 114 and the central opening 184 in the extension 172 when they are aligned.

Operation

Referring to FIGS. 17-23, the holster 106 may be attached to the clip 110 when the clip 110 is attached to a belt 104 or not attached, and whether or not the cell phone 102 is already in the holster 106. Hence, the order of assembly may vary, depending on the situation. The following description will assume the clip is not attached to the belt 104 and the cell phone 102 is not slidably engaged with the holster 106.

The holster 106 is brought into engagement with the clip 110 by aligning the extension 172 on the holster 106 with the opening 124 in the clip 110. The holster 106 is pressed against the clip 110 so that the extension 172 slides into the opening 124 and bears against the resilient arm 126, particularly so that the pad 182 on the extension 172 pushes on the outwardly curved surface 140 that extends into the opening 124 when the resilient arm 126 is in a relaxed state. As the holster 106 is pressed firmly against the clip 110, the height of the extension 172 causes the pad 182 to flex the resilient arm 126 by pushing the resilient arm 126 away from the main body 114 of the clip 110. This preloads the resilient arm 126 so that it will clamp the belt 104 or other article of clothing or object on which the clip is to be attached.

While the holster 106 is being pressed against the clip 110, the slider 112 is positioned in the opening 132 in the left side 130 of the clip body 114. The truncated end 199 of the slider 112 is first inserted into the cutout 142 adjacent the left opening 132 with the hand grip section 186 facing away from the body 114 of the clip 110. Because the holster 106 is pressed up against the clip 110, the central opening 184 of extension 172 is aligned with the left and right openings 132, 133, which allows the distal end 199 of the slider to pass through all of the openings 132, 133, 184 and allows the hand grip 186 to slide up to and butt against the elongate wall 144. The depth of the elongate cutout 142 accommodates the thickness of the slider 112 at the hand grip portion 186 so that the slider is flush with the body 114 of the clip 110 when fully inserted. This is important to present as few edges and corners as possible in order to avoid snagging clothing and other objects when using the apparatus 100.

The cell phone 102 is oriented for insertion into the holster with both the circular projection 168 and the stop member 206 facing outward from the body 114 of the clip 110 and aligned with the respective opening 124 and the slot 202. The cell phone 102 is then slid into the holster 106 until the projection 168 is fully engaged with the opening 166 and the stop member 206 bears against the recessed edge 204 of the slot 202. Ideally the holster wall 152 is flexible and facilitates the function of friction resistance in cooperation with the projection 168 during full engagement and full disengagement process and states. For smoothness of operation, there should be flexibility within this engagement, either at the holster wall 152. Alternatively or in combination with the foregoing, the projection 168 can be formed to be compliant in order to allow flexing or compression thereof.

The clip 110 is attached to the belt by orienting the clip 110 to have the resilient arm facing the belt. The second contact point 135 at the distal end 128 of the arm 126 is slid behind the belt so that the belt is positioned between the curved portion 140 of the arm 126 and the pad 182 on the extension 172. The pressure of the preloaded arm 126 pushes the belt 104 into the serrated edges of the pad 182 to increase the friction against the belt 104 and hold the clip 110 to the belt 104.

Ideally, the apparatus 100 is constructed of injection molded plastic for ease of manufacture as well as durability, maintenance, and replacement of components.

When worn on a user's belt, the clip 110 presents three points of contact. The first contact point is the most outwardly extending upper portion 208 of the arm 126, which will be located between the belt 104 and the user's body as shown in FIG. 1. The second contact point is the distal tip 135 of the arm 126. And the third contact point is the curved bottom 123 of the clip body 114, which curves away from the body 114 in the same direction as the distal tip 135 of the arm 126. These three contact points provide the advantage of stabilizing the apparatus 100. The obtuse angle of the resilient arm 126 has been added to provide unique features. Because the clip 110 is aggressive, when the holster is worn, the upper portion of holster body becomes parallel with the belt, waistline, pocket, etc. The midsection and lower portion of the profiled part are then forced towards the user's body. This new holster profile provides very little lateral movement and a snug fit that clings securely to the belt and hence to the user's body. Also, the obtuse angle of the arm relative to the longitudinal axis of the clip 110 greatly reduces and may eliminate any discomfort caused by the clip digging into the user's body. The top 208 of the arm 126, the bottom 135 of the arm 126, and the bottom 123 of the clip body 114 are in the same plane, eliminating typical pressure points and discomfort.

While representative embodiments have been illustrated and described above and in the accompanying drawings, it is to be understood that various changes may be made therein without departing from the scope of the disclosure.

For example, the stop member 206 and respective slot 202 can be eliminated if desired. Also, a bottom could be used with the holster to provide a hard stop, although this is not preferred because having an open bottom on the holster enables the apparatus 100 to accommodate appliances, such as cell phones, of different lengths.

FIGS. 25-34 illustrate a preferred implementation of the present disclosure wherein a mounting block with a stop block and resistance protrusion are formed as a separate component and then attached to a case for the cell phone. Generally, the new mounting block component has a protrusion stop block and a ramped resistance block integrated with a mounting block body. This mounting block is designed to be installed from the back side of a protective phone case and into aligning mechanical cut-outs of the protective phone case.

Figure 25:
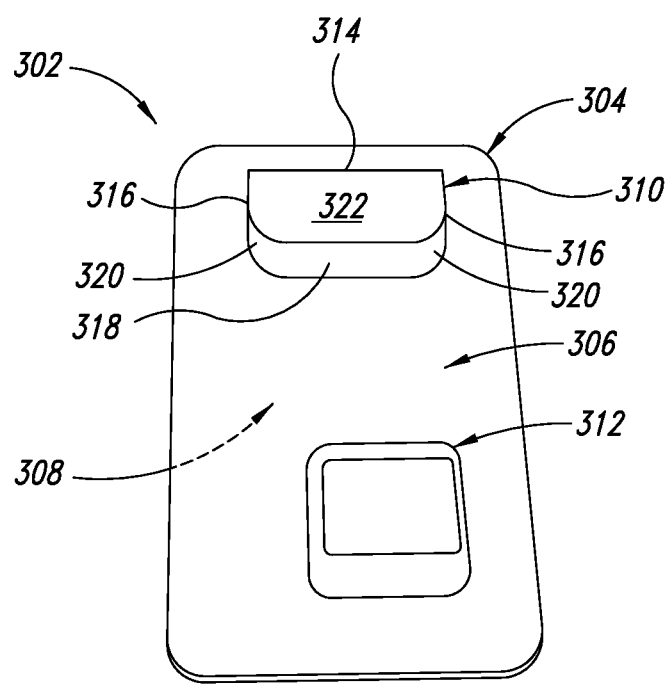
FIG. 25 is a top front axonometric view of a mounting block with a stop block and ramped resistance protrusion formed in accordance with another implementation of the present disclosure.
Figure 26A:
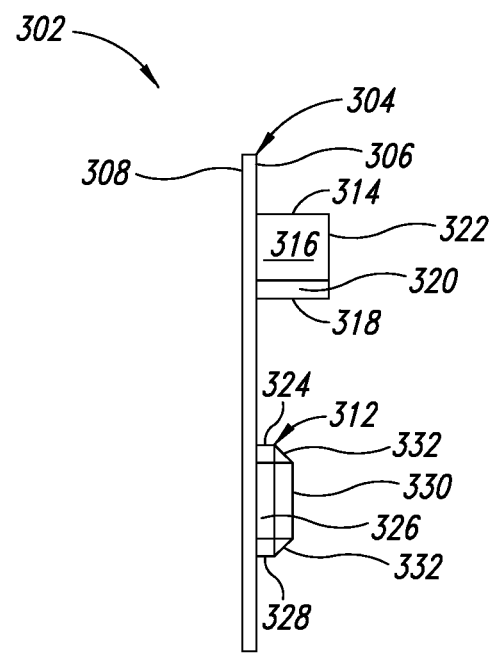
FIG. 26A is a left side view of the mounting block of FIG. 25.

FIGS. 25 and 26A illustrate a mounting block 302 having a planar body 304 with opposing front and rear surfaces 306, 308. Ideally the body 304 has a thickness in the range of 0.005 to 0.1200 inches and is formed of a rigid material. Its planform dimensions can be in the range of 1.500 inches to 3.500 inches high and 0.250 inches to 4.000 inches wide. As shown here, the corners are rounded to prevent snagging on the holster and clothing that can be caused by sharp corners.

Extending from the front surface 306 of the body 304, near the top half, is a stop block 310, and near the bottom half under the stop block 310 is a resistance block 312. The stop block 310 and resistance block 312 may each be formed separate from the body 304 and attached to it using conventional attachment means, such as adhesive, fasteners, and the like, or they may be integrally formed with the body 304 and of the same material as the body 304.

The stop block 310 has a rectilinear planform shape with a planar top surface 314, side surfaces 316, bottom surface 318, and rounded bottom corners 320 that transition from the respective side surface 316 to the bottom surface 318. The radius of curvature of the rounded bottom corners 320 is a matter of design choice for aesthetics and appearance. The front surface 322 is preferably planar and is located about 0.150 inches from the front surface 306 of the body 304 to define the thickness of the stop block 310.

The resistance block 312 has more of a square planform shape with a planar top surface 324, planar side surfaces 326, and planar bottom surface 328 that all intersect with a planar front surface 330. The top and bottom surfaces 324, 328 have distal edges that are beveled to provide an angled connecting surface 332 between the front surface 330 and the top and bottom surfaces 324, 328. The angle or degree of bevel of the top and bottom edges is a matter of design choice for aesthetics and appearance. The beveled edges facilitate installation and use of the mounting block 302 as described below. The front surface 330 of the resistance block 312 is located a shorter distance from the front surface 306 of the mounting block body 304 than is the 322 of the stop block 310 to define a smaller thickness of the resistance block 312 relative to the stop block 310. Ideally this smaller thickness is in the range of 0.350 inches to 0.125 inches.

Figure 26B:
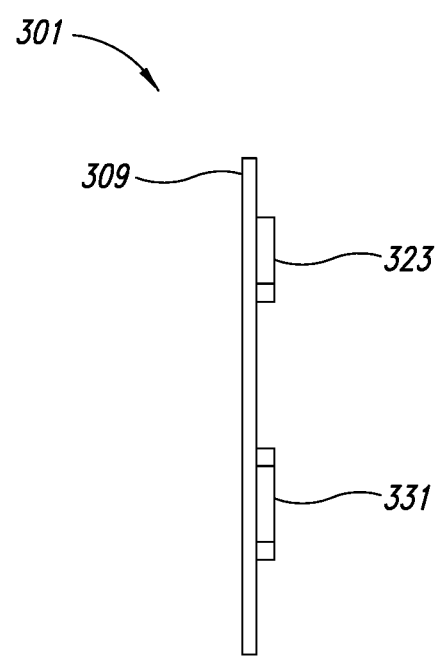
FIG. 26B is a left side view of a mounting plug formed in accordance with the present disclosure.

FIG. 26B illustrates a mounting plug 301 to be used in place of the mounting block 302, such as when the mounting block 302 is not in use. The mounting plug 301 has a body 309 from which two low-profile plugs 323 and 331 extend from a front surface. These low-profile plugs 323 and 331 have the identical planform shape as the stop block 310 and resistance block 312 but are much smaller in thickness so as not to interact with the holster.

Figure 27:
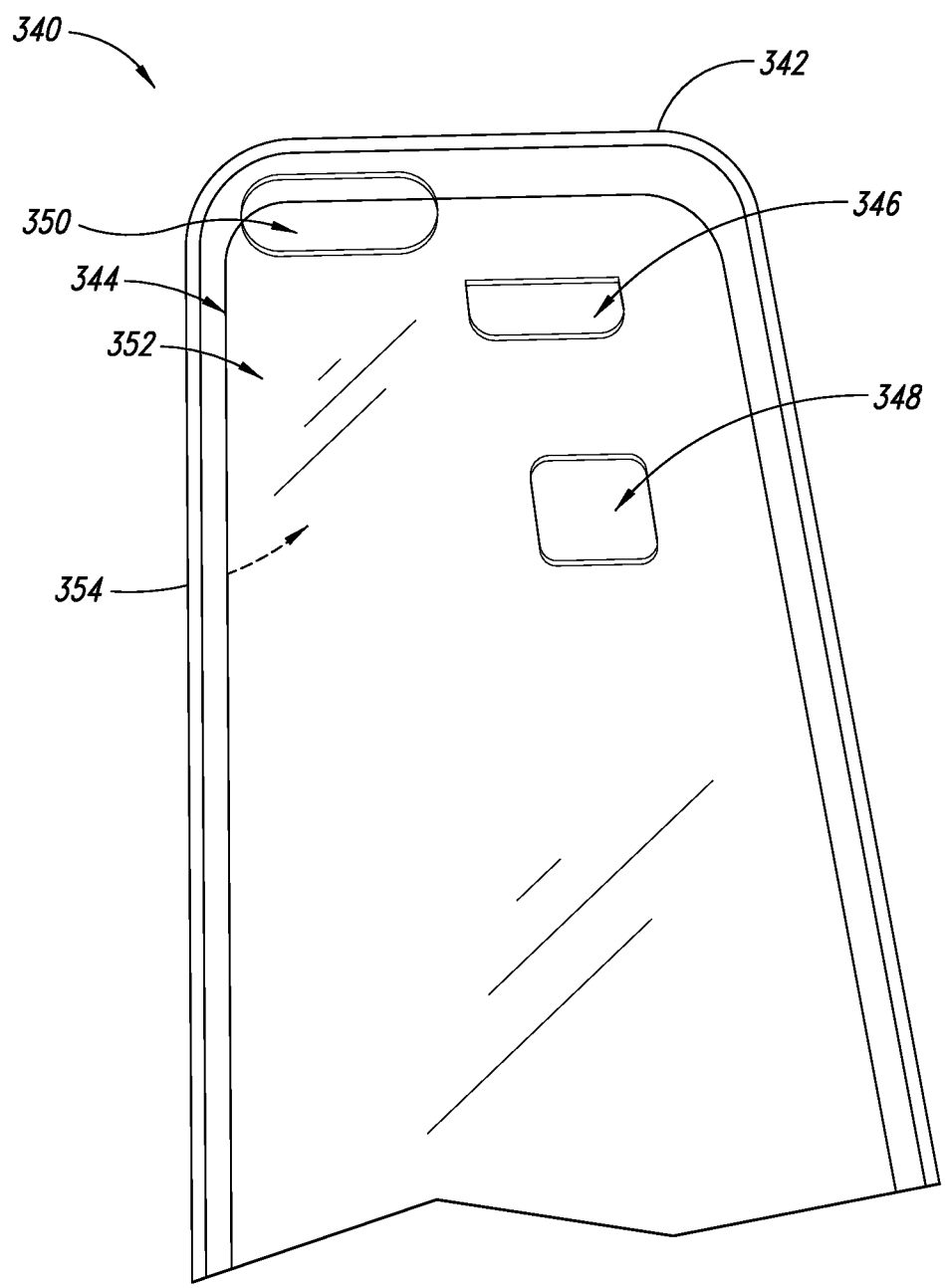
FIG. 27 is a top front view of a clear phone case with cutouts for the stop block and resistance protrusion.

When the mounting plug 301 is installed, the two low-profile plugs 323 and 331 are designed to be flush out with the outside surface of protective case 352 (shown in FIG. 27). The mounting plug 301 provides an aesthetic appearance to the phone case when the mounting block 302 is not used, and it adds versatility and functionality if a protective case is purchased with mechanical openings described herein. This new protective case can be assembled with the proposed flush components 323, 331 positioned in the mechanical openings in the case, with the body 309 sandwiched between the phone and the case as described more fully herein so that the phone case looks and functions as a conventional protective phone case. This allows the phone owner to purchase just the phone case, or they can purchase the same case that can be easily adapted to a complete case with the holster system described herein at any time. Because the mounting plug 301 is not adhesively attached, it can be easily removed and interchanged with the mounting block 302 and reassembled to an upgraded phone holster system.

FIG. 27 illustrates a clear phone case 340 that is also a preferred implementation of the present disclosure to be used with the mounting block 302 and mounting plug 301 described above. The clear phone case 340 has a circumscribing rectangular frame 342 with a clear (transparent), planar protective plate 344 mounted within the frame 342. A stop block opening 346 and a resistance block opening 348 are formed in the clear plate 344 that are sized and shaped to permit the stop block 310 and resistance block 312, respectively, to be slidably received therethrough. A third opening 350 is provided to give unobstructed access to cell phone features, such as a lens, sensors, and the like. As shown in FIG. 27, the clear plate 344 has a front side 352 and a back side 354 that are mutually opposing parallel planar surfaces.

Figure 28:
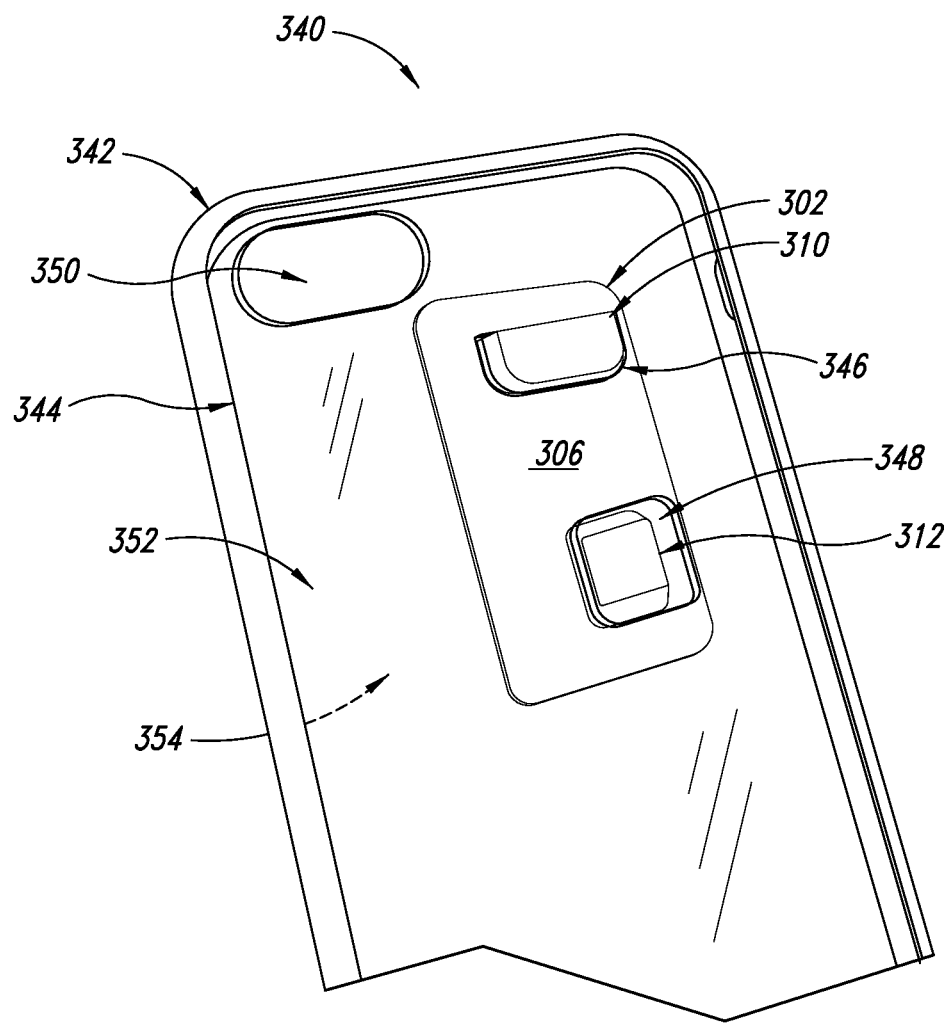
FIG. 28 is a partial left front axonometric view of the mounting block of FIGS. 25 and 26 being installed on a rear side of the clear phone case of FIG. 27.
Figure 29:
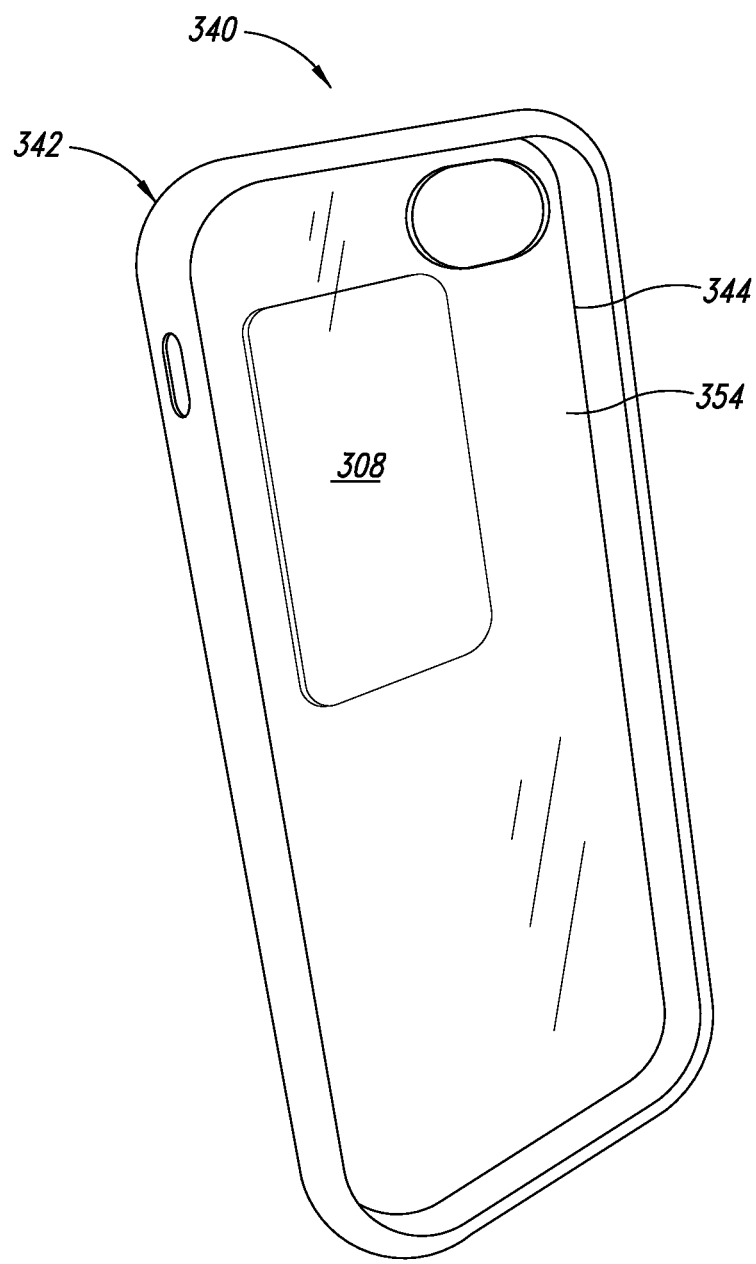
FIG. 29 is a rear right side view that illustrates the mounting block fully installed in the clear phone case.
Figure 30:
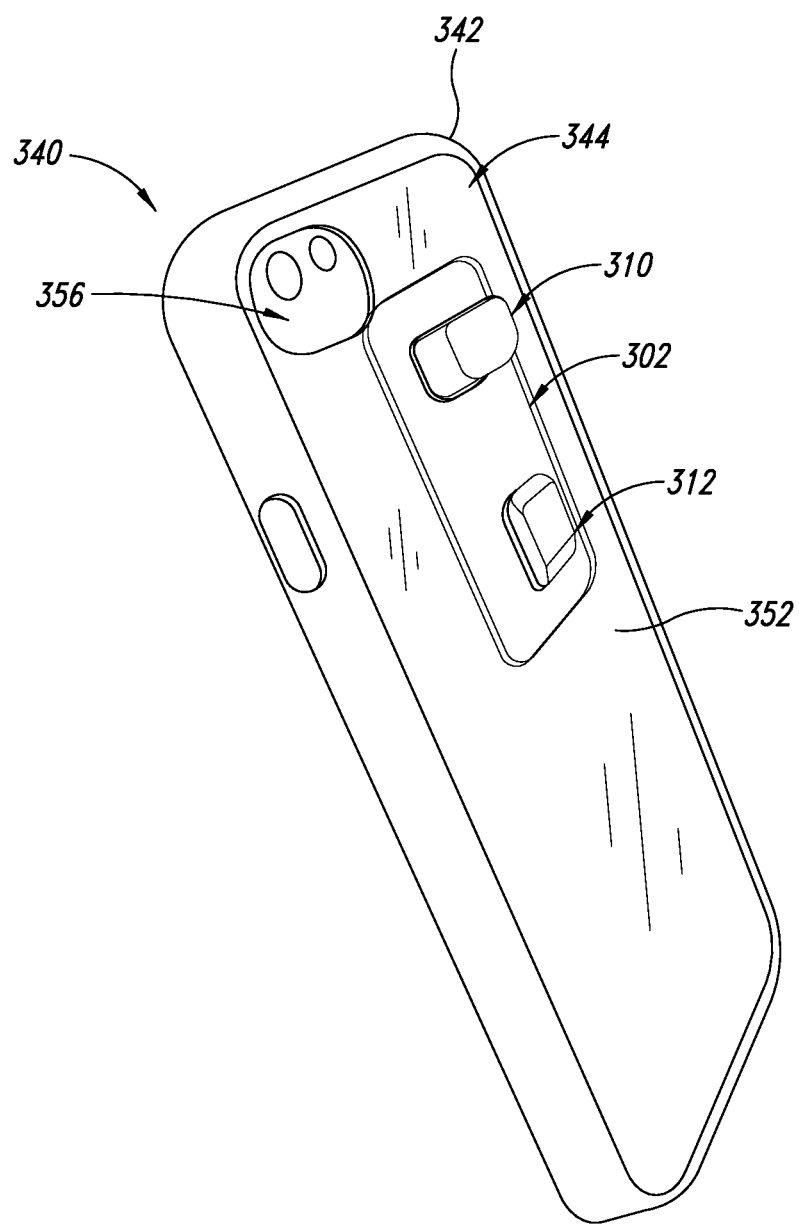
FIG. 30 is a left front axonometric view of the mounting block fully installed in the clear phone case with a cell phone mounted in the case.

Installation of the mounting block 304 on the clear plate 344 is shown in FIGS. 28-30. In FIG. 28 the mounting block 304 is positioned to have its front surface 306 adjacent the back side 354 of the clear plate with the stop block 310 partially inserted into the stop block opening 346 and the resistance block 312 positioned just outside the resistance block opening 348. In FIG. 29 the back side 354 of the clear plate FIG. 30 is shown with the rear surface 308 of the mounting block 304 positioned thereon and held in place without physical bonding or attachment with fasteners. Because mounting block 302 with protrusions and flush block 301 with protrusions are designed to be easily removable and interchangeable within the inside of phone case with mechanical openings, no adhesion or permanent connection with mechanical fasteners is utilized in this representative implementation.

Figure 31:
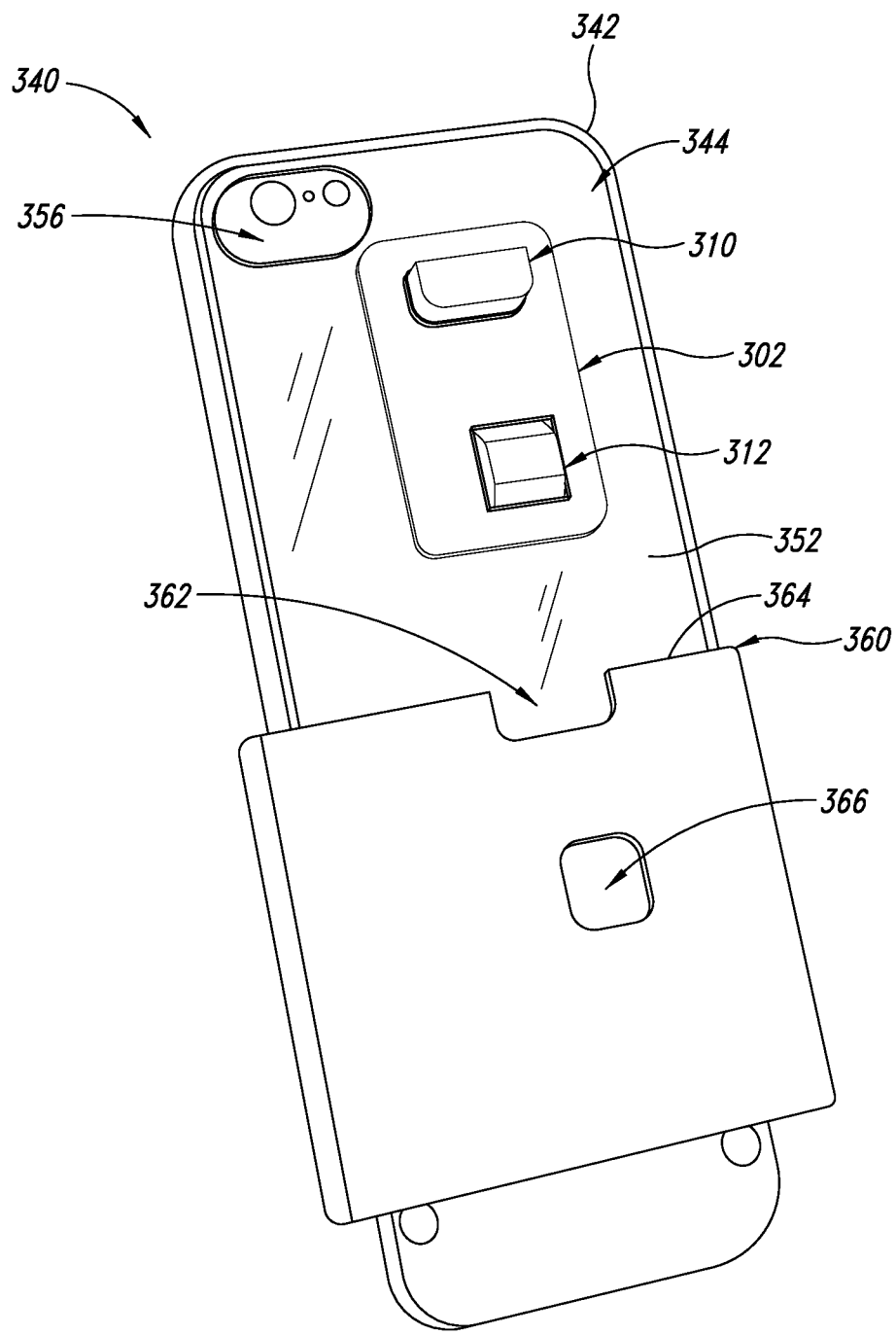
FIG. 31 is a left front axonometric view of the cell phone with case partially inserted into a holster formed in accordance with the present disclosure.
Figure 32:
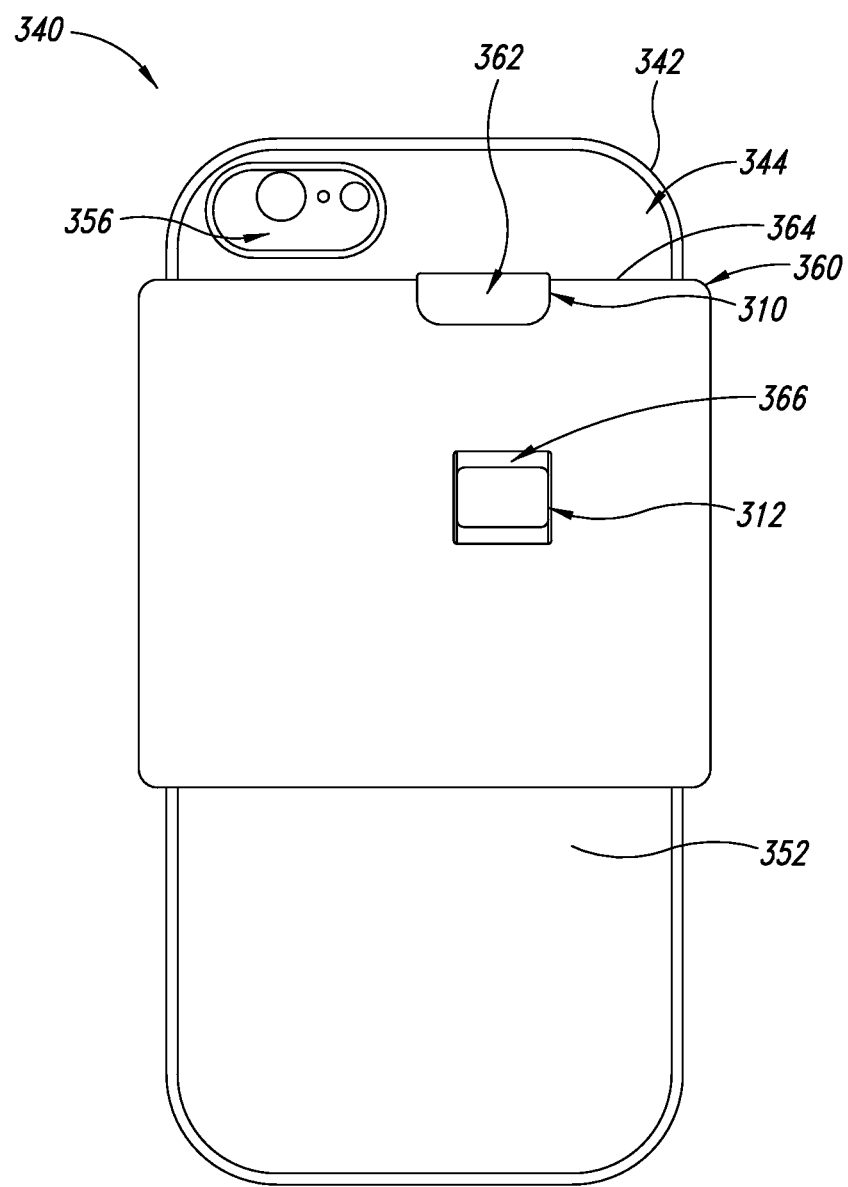
FIG. 32 is a front view of the cell phone and case fully inserted into the holster.

In FIG. 30 a cell phone 356 is shown inserted into the phone case 340 with the mounting block 304 attached to the back side 354 of the clear plate 344. In FIGS. 31 and 32, the cell phone 356 and phone case 340 with mounting block 302 are inserted into a holster 360 that has a stop block cutout 362 in the top edge 364 and a resistance block opening 366 sized, shaped, and positioned to receive the stop block 310 and resistance block 312 respectively in slidable engagement therein.

Figure 33:
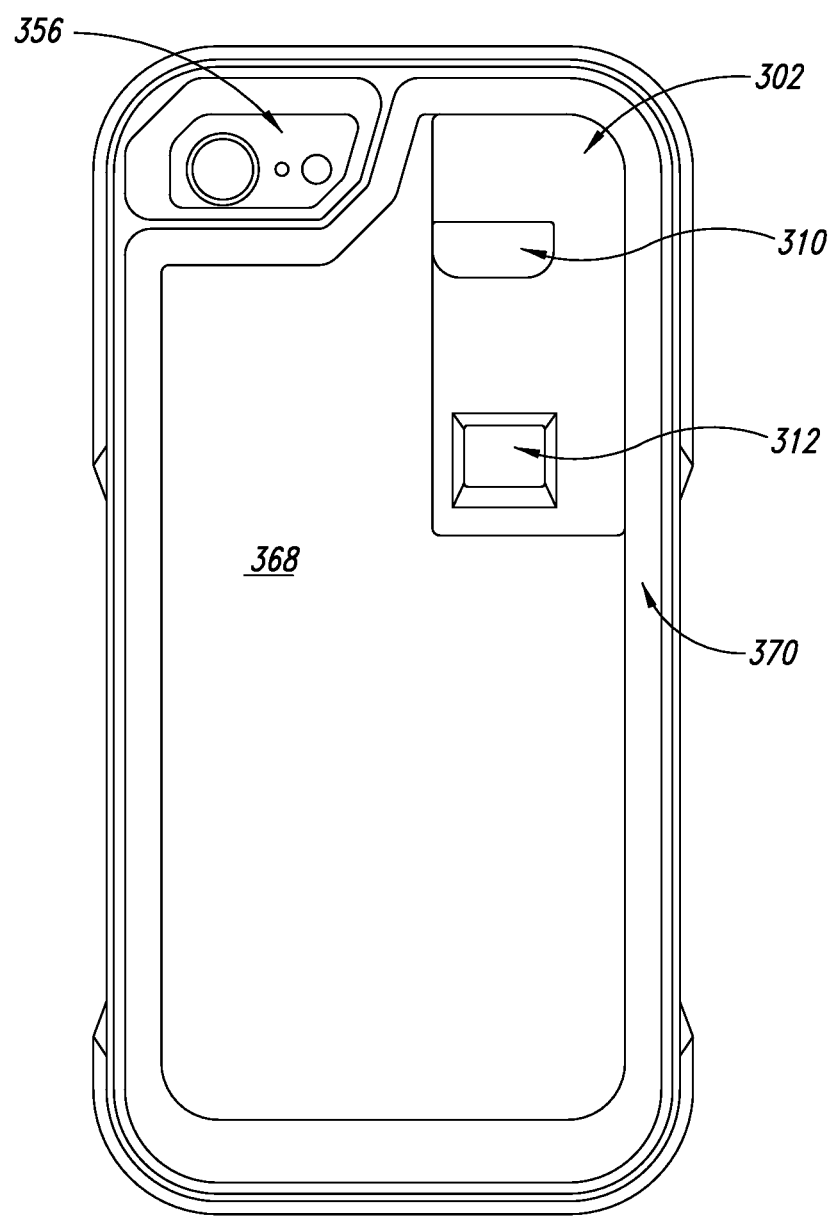
FIG. 33 is a front view of the mounting block attached to the exterior of a typical case for a cell phone.
Figure 34:
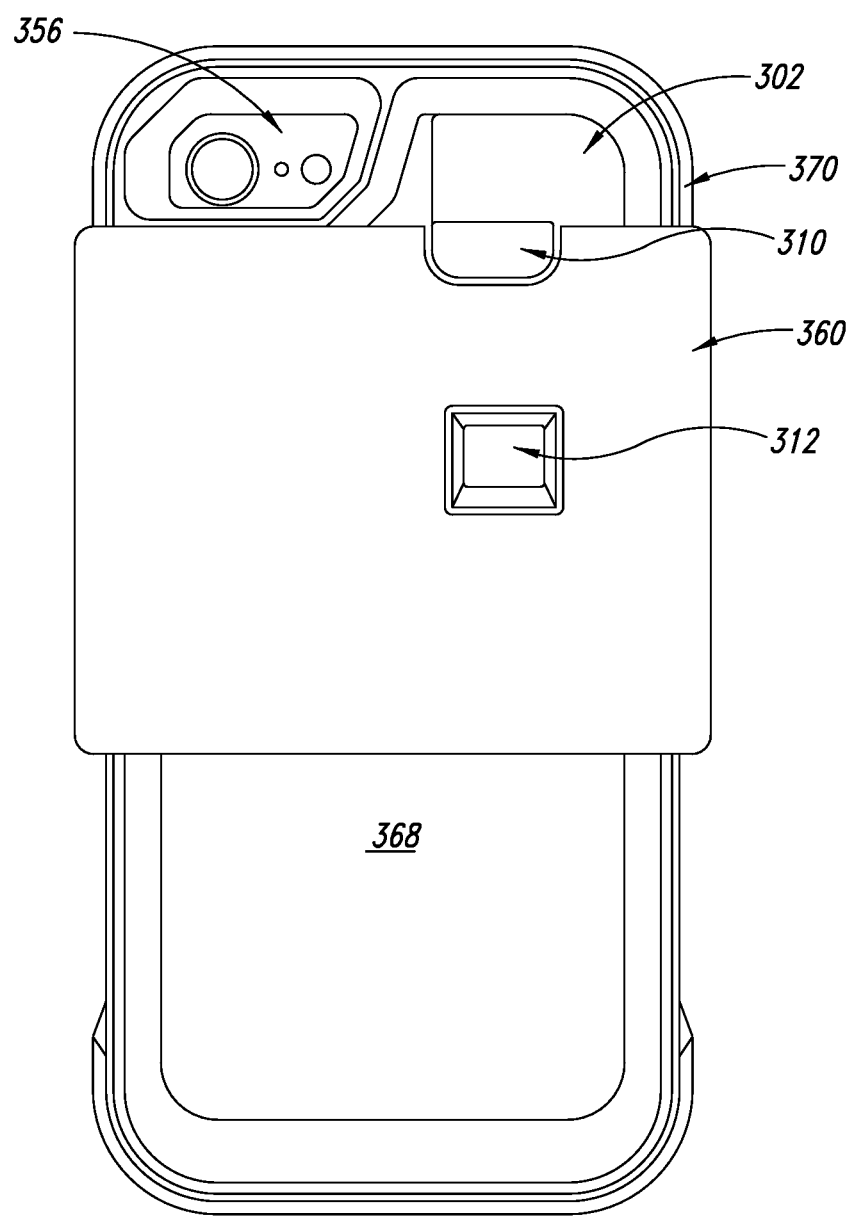
FIG. 34 is a front view of the cell phone and case with exterior mounting block fully inserted into a holster.

A further alternative embodiment of the present disclosure is shown in FIGS. 33 and 34 in which the mounting block 304 is attached to the exterior 368 of a typical phone case 370. More particularly, the rear surface 308 of the mounting block is attached, preferably with adhesive, to the exterior 368 of the phone case 370. The phone 356 and case 370 are then inserted into the holster 360 as shown in FIG. 34.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for mounting an appliance to an article of clothing, the apparatus comprising:
    a holster sized and shaped to receive the appliance in slidable engagement;
    an engagement apparatus to hold the appliance in engagement with the holster;
    a clip sized and shaped to removably attach to the article of clothing;

a retainer assembly configured to releasably attach the holster to the clip; and wherein the holster includes a housing with an outside wall and an inside wall to define an interior sized and shaped to receive the appliance in slidable engagement, and wherein the engagement apparatus includes an opening formed in the outside wall of the housing and a projection attached to the appliance that is sized and shaped to slidably engage with the opening in the housing to retain the appliance in engagement with the housing and to enable the appliance to be manually pulled from the housing with a resistance.

2. The apparatus of claim 1, wherein the retainer assembly comprises a first retainer member associated with the holster, a second retainer member associated with the clip, and a third retainer member configured to engage the first and second retainer members and hold the first and second retainer members in place and thereby releasably attach the holster to the clip.

3. The apparatus of claim 2, wherein the holster includes a housing with an outside wall and an inside wall to define an interior sized and shaped to receive the appliance in slidable engagement, and wherein the first retainer member comprises a projection extending from the inside wall of the holster and having a slot formed therein, the second retainer member comprises a receiver on the clip sized and shaped to receive the projection on the housing, the receiver including a slot that is sized, shaped, and positioned on the clip to align with the slot in the projection, and the third retainer member comprises a slider sized and shaped to slide into the slot in the first retainer member and into the slot in the receiver to releasably hold the projection in the receiver and thereby attach the holster to the clip.

4. The apparatus of claim 1, further comprising a stop assembly configured to limit travel of the appliance into the housing.

5. The apparatus of claim 4 wherein the outside wall of the housing has a proximal edge, and the stop assembly includes a slot with a recessed edge formed in the proximal edge of the outside wall of the housing, and the stop assembly further includes a stop member attached to the appliance that is sized and shaped to slidably engage the slot and bear against the recessed edge to prevent further travel of the appliance into the holster.

6. An apparatus for mounting an appliance to an article of clothing, the apparatus comprising:
a holster sized and shaped to receive the appliance in slidable engagement;
an engagement apparatus to hold the appliance in engagement with the holster;
a clip sized and shaped to removably attach to the article of clothing;
a retainer assembly configured to releasably attach the holster to the clip; and
wherein the holster includes an outside wall and an inside wall and a projection extending from the inside wall, and wherein the clip comprises a body that includes a proximal end, a resilient tongue extending from the proximal end to engage with the article of clothing, and a receiver sized and shaped to receive the projection on the holster, the receiver having a through-opening and structured to position the projection against the tongue as the projection is engaged with the receiver to preload the tongue and apply pressure to the article of clothing in response to positioning the article of clothing between the tongue and the projection and thereby retain the clip in positive engagement with the article of clothing.

7. The apparatus of claim 6 wherein the body of the clip has an interior side and an exterior side, and the resilient tongue is located on the interior side of the body, the body having a longitudinal axis and the proximal end of the clip is angled away from the longitudinal axis of the body to form an obtuse angle with the interior side of the body of the clip.

8. A holster for a cell phone having a protective case, comprising:
a belt clip having a body with a front face and a rear face, a top, and a bottom that is chamfered to form a first (lower) contact point, a first opening extending through the body, a pair of second openings formed in the body orthogonal to the first opening, and a resilient arm having proximal end extending from the top at less than a 180 degree angle to form a second (upper) contact point, and a distal end that is curved to form a third contact point;
a holder sized and shape to receive and hold the cell phone, the holder including a holding member to engage with the cell phone, a cutout to stop the cell phone from further travel of the appliance into the holder, and a protrusion sized and shaped to be received into the first opening in the body of the belt clip; and
a retainer sized and shaped to retain the holder in engagement with the belt clip, the retainer slidably engageable with the holder and the belt clip to hold the holder in engagement with the belt clip.

9. The holster for the cell phone of claim 8, wherein the protrusion on the holder is configured to bear against the distal end of the resilient arm to preload the resilient arm with tension.

10. The holster for the cell phone of claim 9, wherein the body has a midline and the upper contact point is on a forward side of a midline.

11. The holster for the cell phone of claim 9 wherein the protrusion is integrally formed with the cell phone or with the protective case on the cell phone.

12. An apparatus to mount an appliance to an article of clothing, the apparatus comprising:
a holster sized and shaped to receive the appliance in slidable engagement and to attach to the article of clothing;
an engagement apparatus that is sized and shaped to attach to the apparatus and includes a mounting block have a stop block and a resistance block extending from a surface of the mounting block that are sized and shaped to engage the holster and hold the appliance in slidable engagement with the holster;
a protective case that is structured to attach to the appliance, the protective case having a first opening sized and shaped to receive the stop block and a second opening sized and shaped to receive the resistance block so that the stop block and resistance block extend through the protective case and beyond the protective case to engage the holster, the protective case structured to attach to the appliance and hold the mounting block in place between the protective cover and the appliance only by pressure between the protective case and the appliance.

13. The apparatus of claim 12 wherein the holster has a first opening sized and shaped to receive the resistance block within the opening and retain the protective case and appliance in slidable engagement with the holster, and the holster having a second opening sized and shaped to receive the stop block to stop travel of the protective case and appliance within the holster.

14. The apparatus of claim 12 wherein the resistance block has beveled edges to facilitate movement of the resistance block into and out of the second opening in the holster.

15. The apparatus of claim 12 further including a mounting plug having a body and first and second protrusions extending from the body that are sized and shaped to be received in the first and second openings, respectively, in the protective case and to not extend past the protective case, the body structured to be held in place between the protective case and the appliance by pressure only between the protective case and the appliance.

* * * * *